US009519056B2

(12) United States Patent
Schroeder et al.

(10) Patent No.: US 9,519,056 B2
(45) Date of Patent: Dec. 13, 2016

(54) SYSTEM AND METHOD FOR EVALUATING WIND FLOW FIELDS USING REMOTE SENSING DEVICES

(71) Applicant: Texas Tech University System, Lubbock, TX (US)

(72) Inventors: John Schroeder, Lubbock, TX (US); Brian Hirth, Lubbock, TX (US); Jerry Guynes, Lubbock, TX (US)

(73) Assignee: Texas Tech University System, Lubbock, TX (US)

( * ) Notice: Subject to any disclaimer, the term of this patent is extended or adjusted under 35 U.S.C. 154(b) by 502 days.

(21) Appl. No.: 13/952,606

(22) Filed: Jul. 27, 2013

(65) Prior Publication Data

US 2014/0028495 A1 Jan. 30, 2014

Related U.S. Application Data

(60) Provisional application No. 61/676,394, filed on Jul. 27, 2012, provisional application No. 61/683,022, filed on Aug. 14, 2012.

(51) Int. Cl.
*G01S 13/95* (2006.01)
*G01P 5/00* (2006.01)
(Continued)

(52) U.S. Cl.
CPC ............... *G01S 13/95* (2013.01); *G01P 5/001* (2013.01); *G01S 13/589* (2013.01); *G01S 13/87* (2013.01);
(Continued)

(58) Field of Classification Search
CPC ........ G01P 5/001; G01S 13/589; G01S 13/87; G01S 13/95; G01S 13/951; G01S 13/956
(Continued)

(56) References Cited

U.S. PATENT DOCUMENTS 4,649,388 A 3/1987 Atlas
2001/0013839 A1 8/2001 Wurmann
(Continued)

FOREIGN PATENT DOCUMENTS

WO 2011160634 A1 12/2011

OTHER PUBLICATIONS

Hirth et al, "Measuring a utilty scale turbine wake using the TTUKA mobile research radars", Jun. 8, 2012, J Atmos. Oceanic technol. vol. 29 pp. 765-771.*
(Continued)

*Primary Examiner* — Timothy A Brainard
(74) *Attorney, Agent, or Firm* — Daniel J. Chalker; Edwin S. Flores; Chalker Flores, LLP

(57) ABSTRACT

The present invention provides a system and method for obtaining data to determine one or more characteristics of a wind field using a first remote sensing device and a second remote sensing device. Coordinated data is collected from the first and second remote sensing devices and analyzed to determine the one or more characteristics of the wind field. The first remote sensing device is positioned to have a portion of the wind field within a first scanning sector of the first remote sensing device. The second remote sensing device is positioned to have the portion of the wind field disposed within a second scanning sector of the second remote sensing device.

52 Claims, 25 Drawing Sheets

(51) Int. Cl.
G01S 13/87 (2006.01)
G01S 13/58 (2006.01)

(52) U.S. Cl.
CPC ............ *G01S 13/951* (2013.01); *G01S 13/956* (2013.01); *F03D 17/00* (2016.05); *F05B 2270/32* (2013.01); *F05B 2270/321* (2013.01)

(58) Field of Classification Search
USPC .......................................................... 342/26 R
See application file for complete search history.

(56) References Cited

U.S. PATENT DOCUMENTS

| | | | |
|---|---|---|---|
| 2002/0024652 | A1 | 2/2002 | Ooga |
| 2006/0202886 | A1 | 9/2006 | Mahapatra |
| 2010/0079330 | A1* | 4/2010 | Venkatachalam ....... G01S 7/003 342/59 |
| 2010/0117892 | A1 | 5/2010 | Barbaresco |
| 2010/0187828 | A1* | 7/2010 | Reidy ...................... F03D 9/005 290/55 |
| 2010/0265120 | A1 | 10/2010 | Drake et al. |
| 2011/0241926 | A1* | 10/2011 | Laufer .................... G01S 7/003 342/61 |
| 2011/0241928 | A1* | 10/2011 | Oswald .................. G01S 13/42 342/90 |
| 2011/0260908 | A1 | 10/2011 | New et al. |
| 2012/0179376 | A1 | 7/2012 | O'Brien et al. |
| 2012/0303278 | A1* | 11/2012 | Dannevik ............... G01W 1/10 702/3 |

OTHER PUBLICATIONS

International Search Report (KIPO) PCT/US2013/052435 dated Nov. 21, 2013.
International search Report and Written Opinion (KIPO) PCT/US2013/052434 dated Dec. 16, 2013.
Barthelmie, R. J., et al., "Modelling and Measurements of Power Losses and Turbulence Intensity in Wind Turbine Wakes at Middelgruden Offshore Wind Farm," Wind Energy Jul. 16, 2007 10:517-528.
Barthelmie, R. J., et al., "Quantifying the impact of wind turbine wakes on power output and offshore wind farms," J. Atmos. Oceanic Technol, Aug. 2010 27:1302-1317.
Chowdhury, S., et al., "Unrestricted wind farm layout optimization (UWFLO): Investigating key factors influencing the maximum power generation," Renewable Energy Feb. 2012 38:16-30.
España, Get al., "Spatial study of the wake meandering using modelled wind turbines in a wind tunnel," Wind Energy Oct. 2011 14:923-937.
Grund, C. J., et al., "High-resolution Doppler lidar for boundary layer and cloud research," J. Atmos. Oceanic Technol., Mar. 2001 18:376-393.
Hirth, Brian D., et al., "Measuring a Utility-Scale Turbine Wake Using the TTUKa Mobile Research Radars," J. Atmos. Oceanic Technol. Jun. 2012 29:765-771.
Hirth, Brian D., et al., "Documenting Wind Speed and Power Deficits behind a Utility-Scale Wind Turbine," J. Appl. Meteor. Climatol., 2013 52:39-46.
Kasler, Y. et al., "Wake measurements of a multi-MW wind turbine with coherent long range pulsed Doppler wind lidar" J. Atmos. Oceanic Technol. Sep. 2010 27:1529-1532.

Khanna, S., et al., "Three-dimensional buoyancy-and shear-induced local structure of the atmospheric boundary layer," J. Atmos. Sci. Mar. 1, 1998 55:710-741.
Knudsen, T., et al., "Prediction models for wind speed at turbine locations in a wind farm," Wind Energy Aug. 8, 2011 14, 877-894.
Kusiak, A., et al., "Design of wind farm layout for maximum wind energy capture," Renewable Energy Mar. 2010 35:685-694.
Larsen, G. C., et al., "Wake meandering—a pragmatic approach," Wind Energy Jul./Aug. 2008 11:4 377-395.
Meyers, J., et al., "Optimal turbine spacing in fully developed wind-farm boundary layers," Wind Energy Mar. 2012 15:305-317.
Newsom, Rob K., et al., "Retrieval of Microscale Wind and Temperature Fields from Single- and Dual-Doppler Lidar Data," J. Applied Meteorol. Sep. 2005 44:1324-1345.
O'Hora, F., et al., "Improving weather radar observations using pulse-compression techniques," Meteorol. Appl. 2007 14:389-401.
Sanderse, B., et al., "Review of computational fluid dynamics for wind turbine wake aerodynamics," Wind Energy Oct. 2011 14:799-819.
Vermeer, N. J., et al., "Wind turbine wake aerodynamics," Prog. Aerosp. Sci., Nov. 2003 39:467-510.
Weiss, C. C., et al., "The TTUKa mobile Doppler radar: Coordinated radar and in situ measurements of supercell thunderstorms during Project VORTEX2," Proc. 34th Conf. on Radar Meteorology, Williamsburg,VA, Amer.Meteor. Soc. 11B.2 2009.
Hirth, Brian D., et al., "Coupling Doppler Radar-Derived Wind Maps with Operational Turbine Data to Document Wind Farm Complex Flows," Wind Energy, submitted 2013.
Larsen, G. C., et al., "Dynamic wake meandering modeling," 2007 Risø Rep. 83 pp.
Wharton, S., et al., "Assessing atmospheric stability and its impacts on rotor-disk wind characteristics at an onshore wind farm," Wind Energy, May 2013 15: 525-546.
Barthelmie, R. J., et al., "Modelling and measuring flow and wind turbine wakes in large wind farms offshore," Wind Energy, Jul. 2009 12, 431-444.
Barthelmie, R. J., et al., "Evaluation of wind farm efficiency and wind turbine wakes at the Nysted offshore wind farm," Wind Energy, Sep. 2010 13, 573-586.
Bingöl, F., et al., "Light detection and ranging measurement of wake dynamics part 1: one-dimensional scanning," Wind Energy Jan. 2010 13, 51-61.
Crespo, A., et al., "Survey of modeling methods for wind turbine wakes and wind farms," Wind Energy Jan. 1999 2, 1-24.
Farnett, E. C., et al., "Pulse Compression Radar" Radar Handbook, M. I. Skolnik (McGraw-Hill, New York, 1990), chap 10.
Gonzalez, J. S., et al., "Optimization of wind farm turbines layout using an evolutive algorithm," Renewable Energy Aug. 2010 35, 1671-1681.
Troldborg, N., et al., "Numerical simulations of wake interaction between two wind turbines at various inflow conditions," Wind Energy Oct. 2011 14, 859-876.
Trujillo, J., et al., "Light detection and ranging measurement of wake dynamics part 2: two-dimensional scanning," Wind Energy Jan. 2011 14, 61-75.
Young, G. S., et al., "Rolls, Streets, Waves and More: A review of Quasi-Two-Dimensional Structures in the Atmosheric Boundry Layer," Bull. Am. Meteorol. Soc. Jul. 2002 83, 997-1001.
EP 13822981.0 Extended European Search Report dated Feb. 1, 2016.
U.S. Appl. No. 13/952,611ffice Action dated Nov. 10, 2015.

* cited by examiner

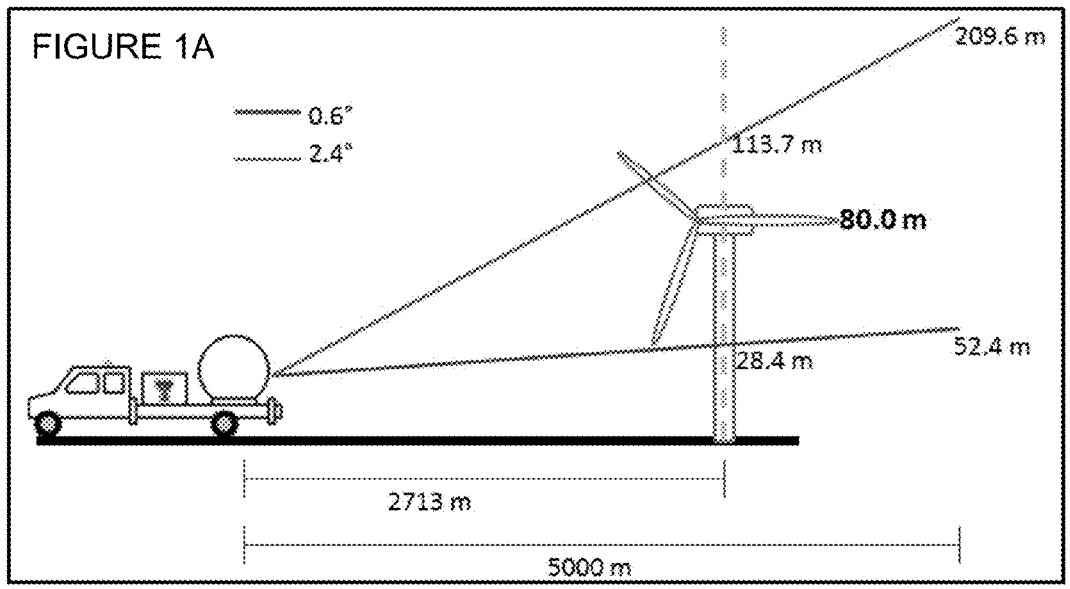
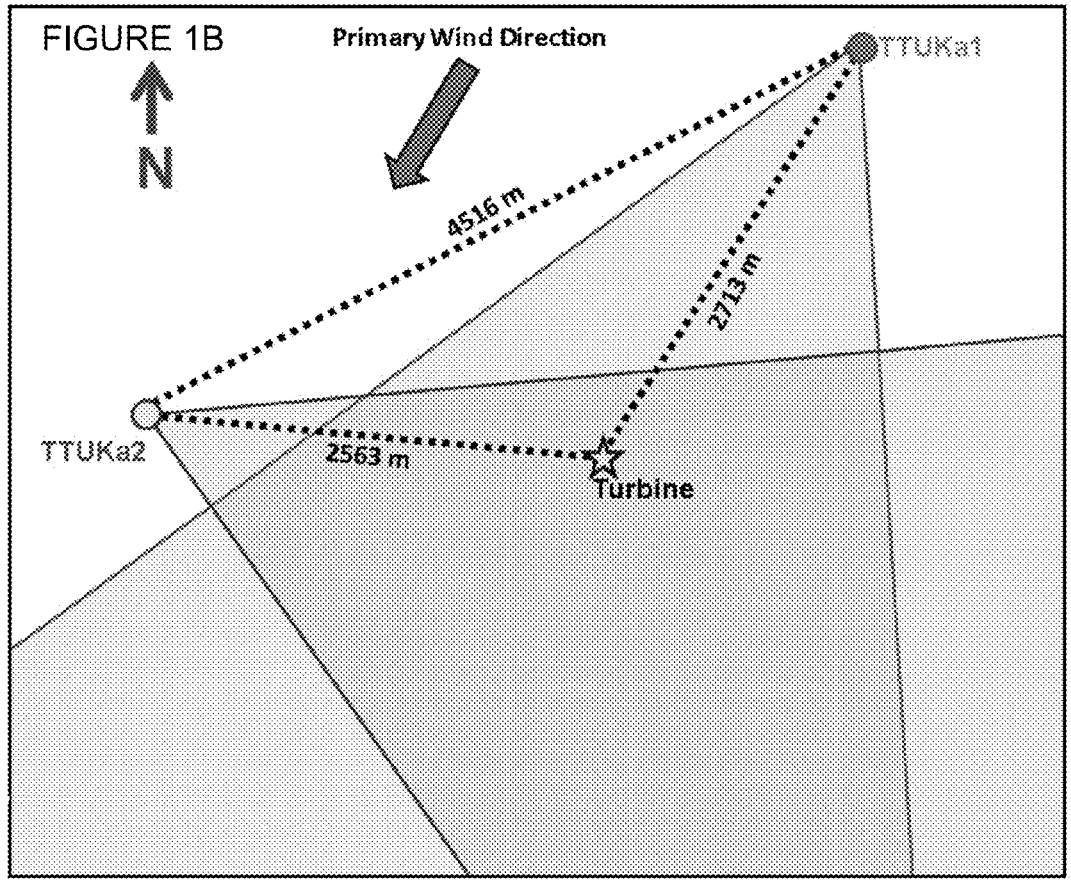

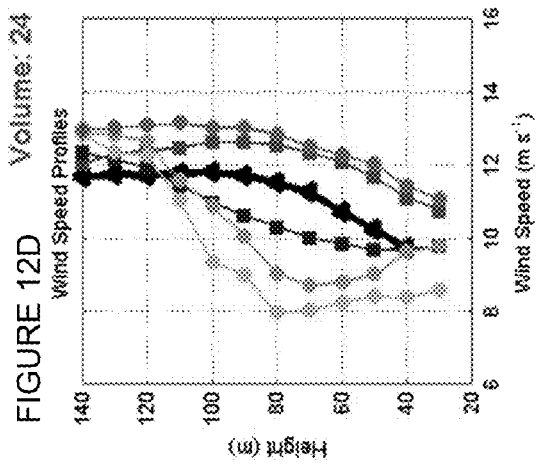
FIGURE 12D
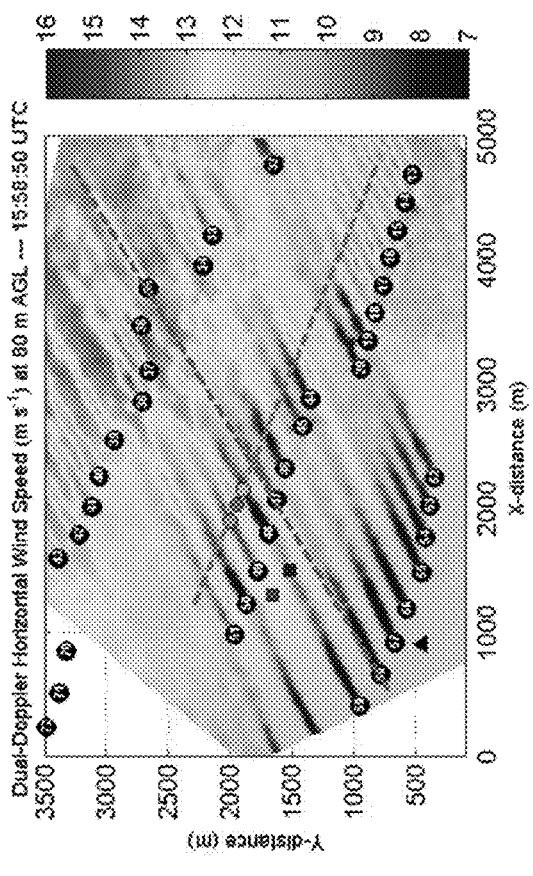
FIGURE 12A
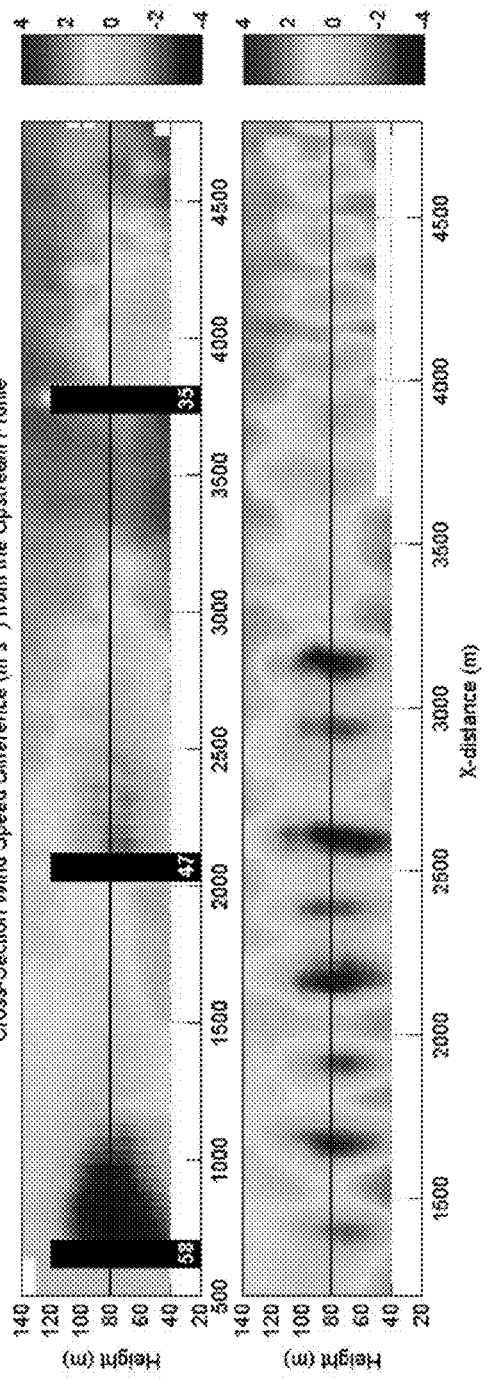
FIGURE 12B
FIGURE 12C

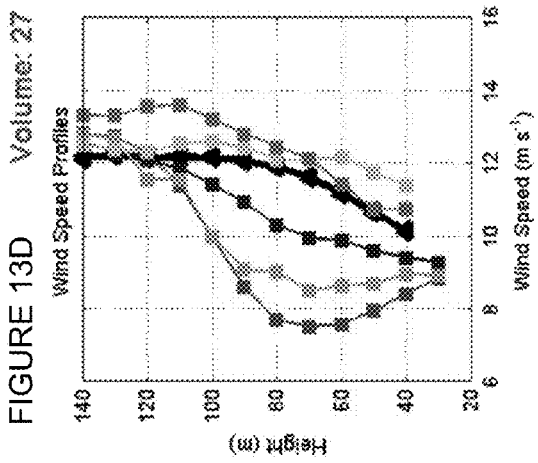
FIGURE 13D
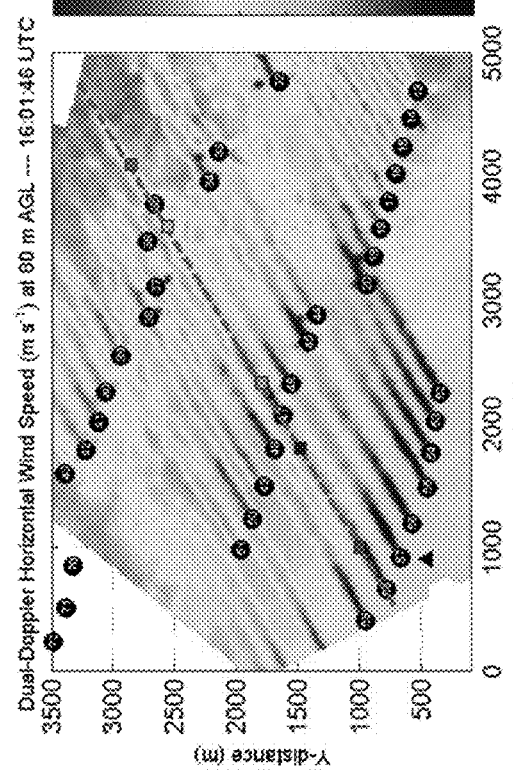
FIGURE 13A
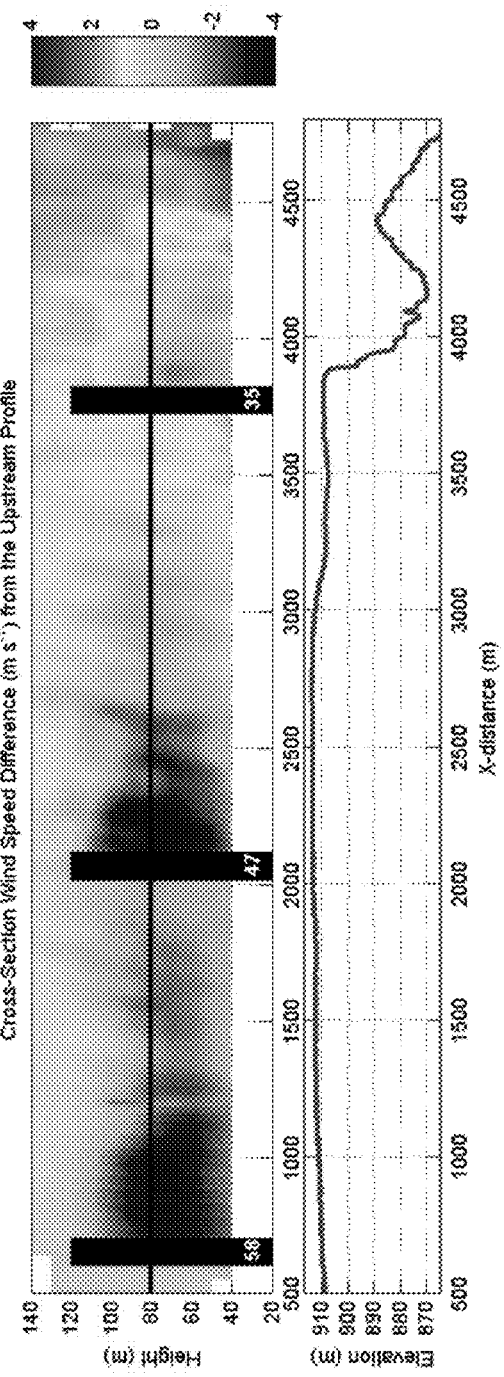
FIGURE 13B
FIGURE 13C

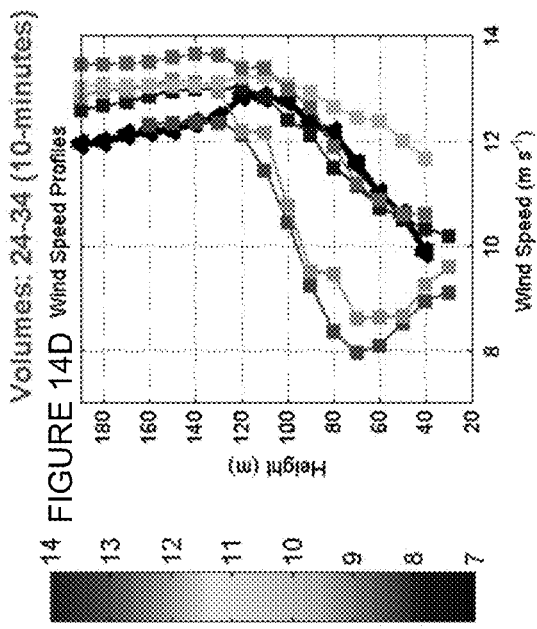
FIGURE 14D
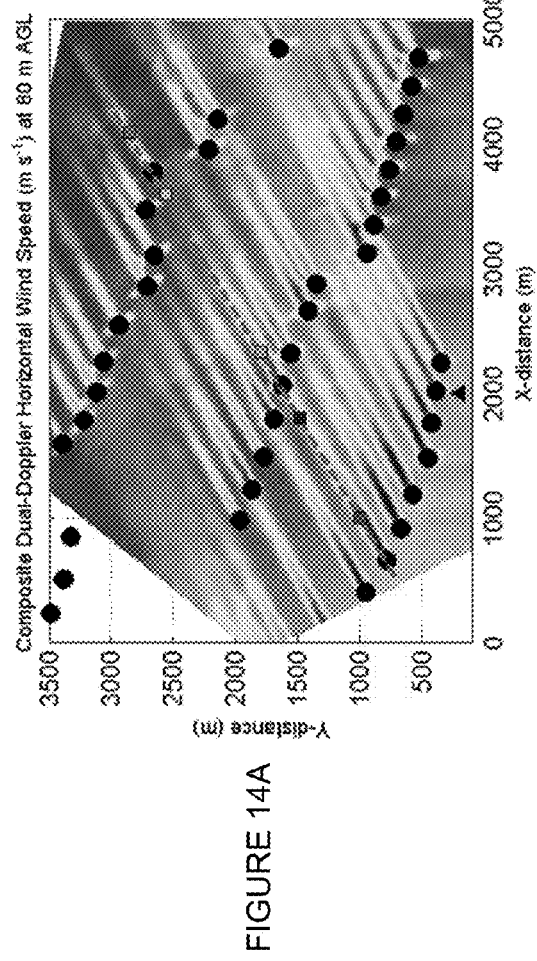
FIGURE 14A
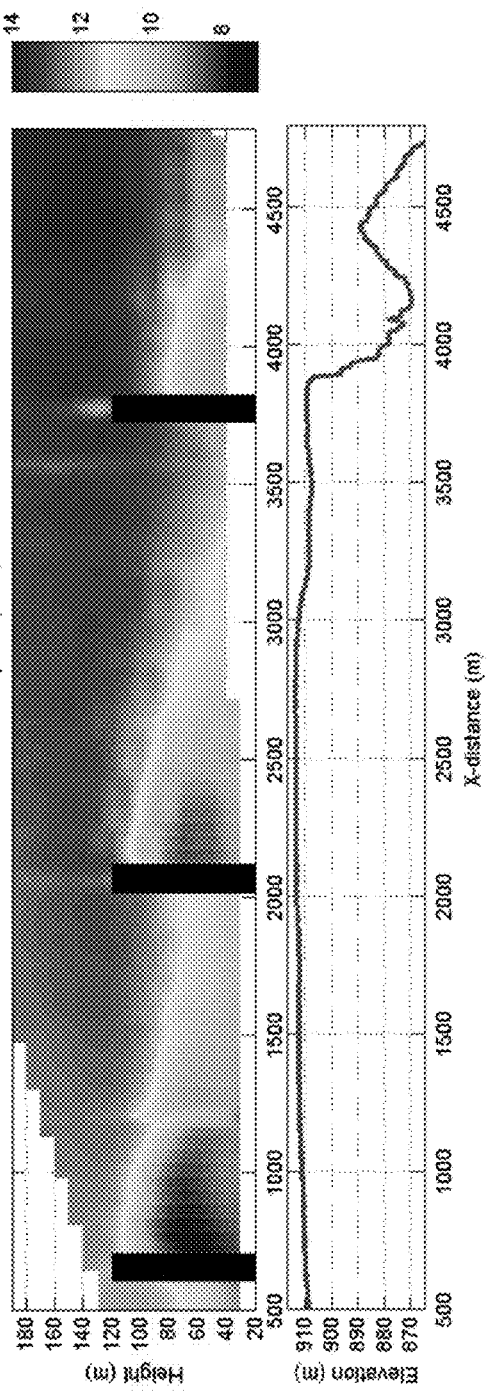
FIGURE 14B
FIGURE 14C

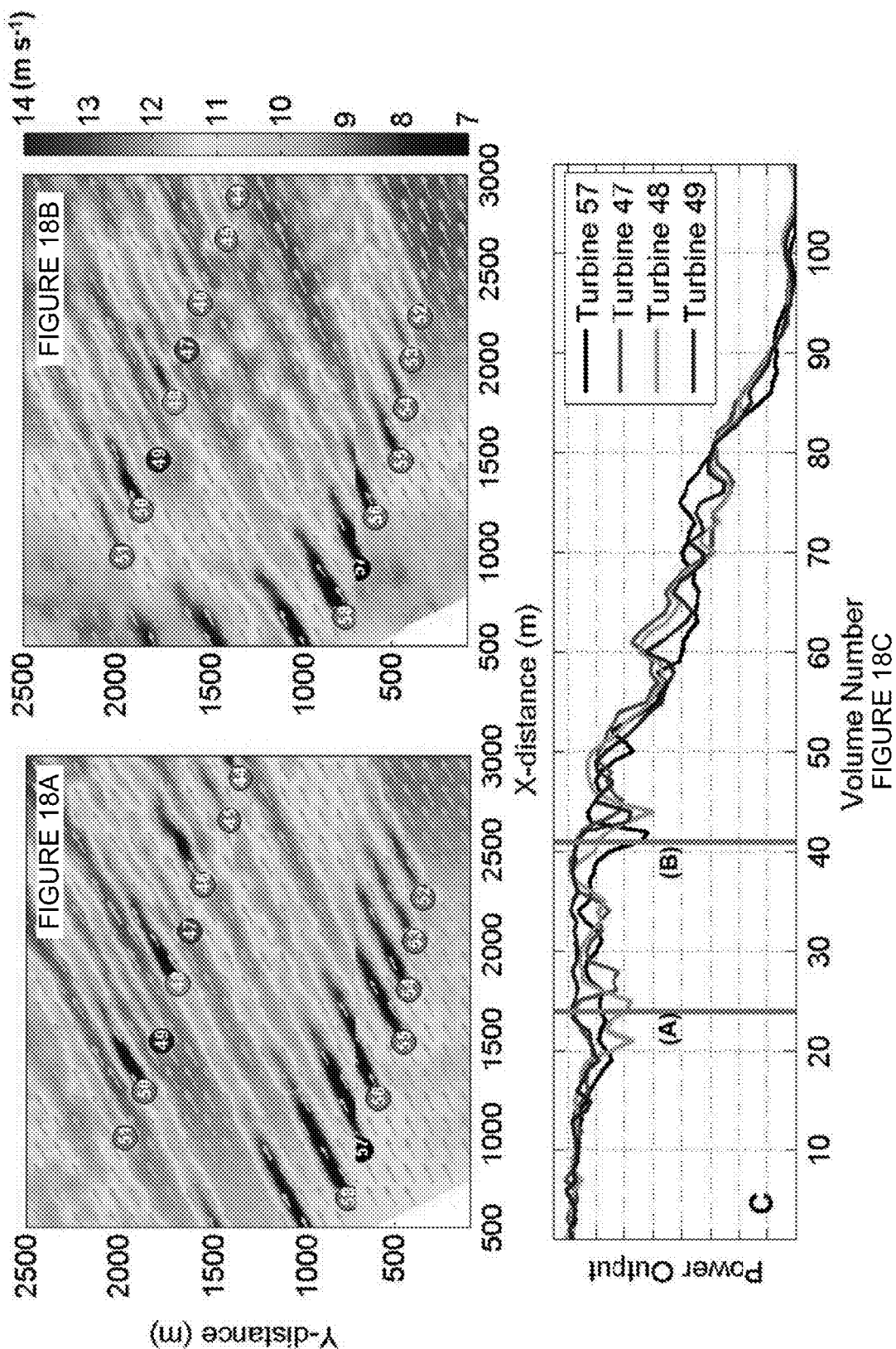

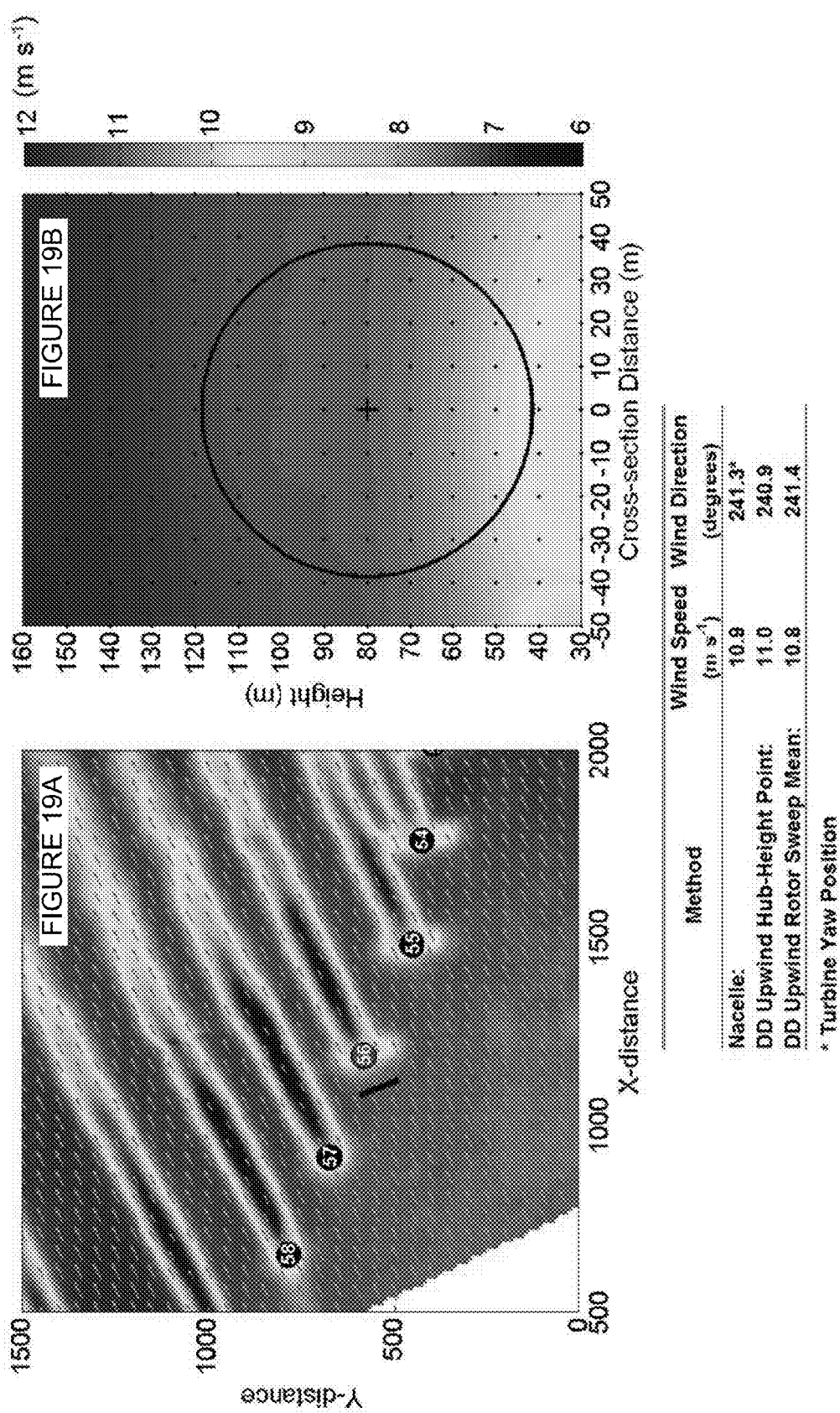

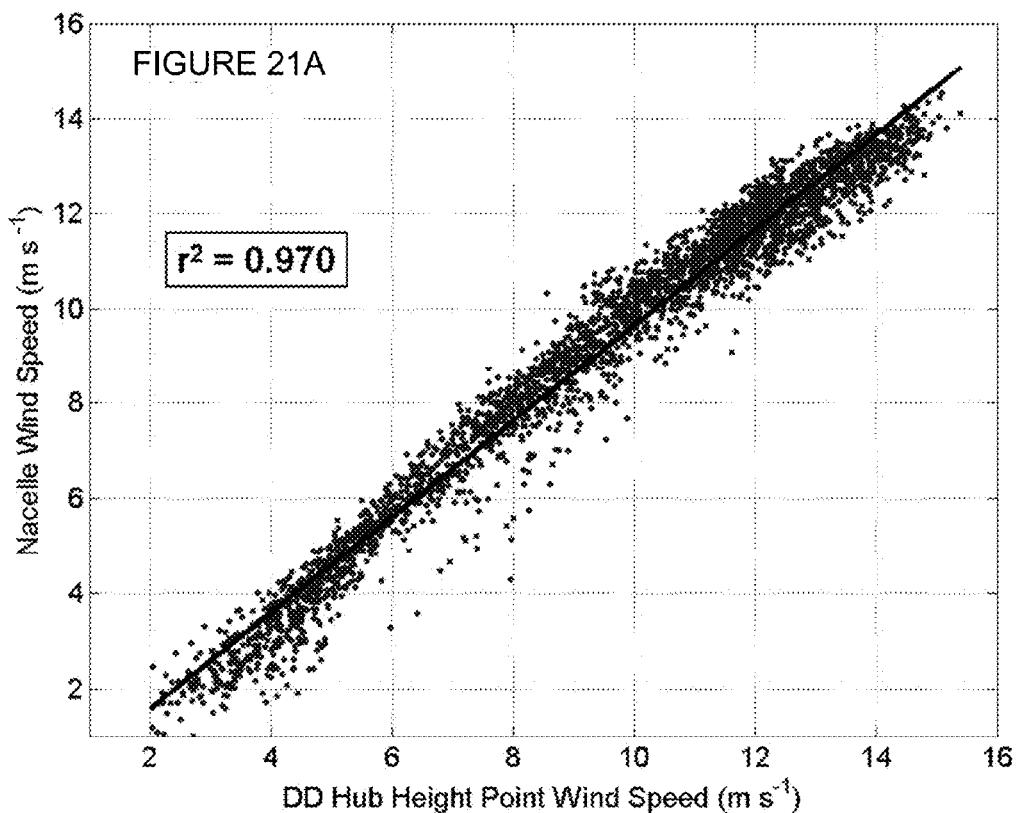
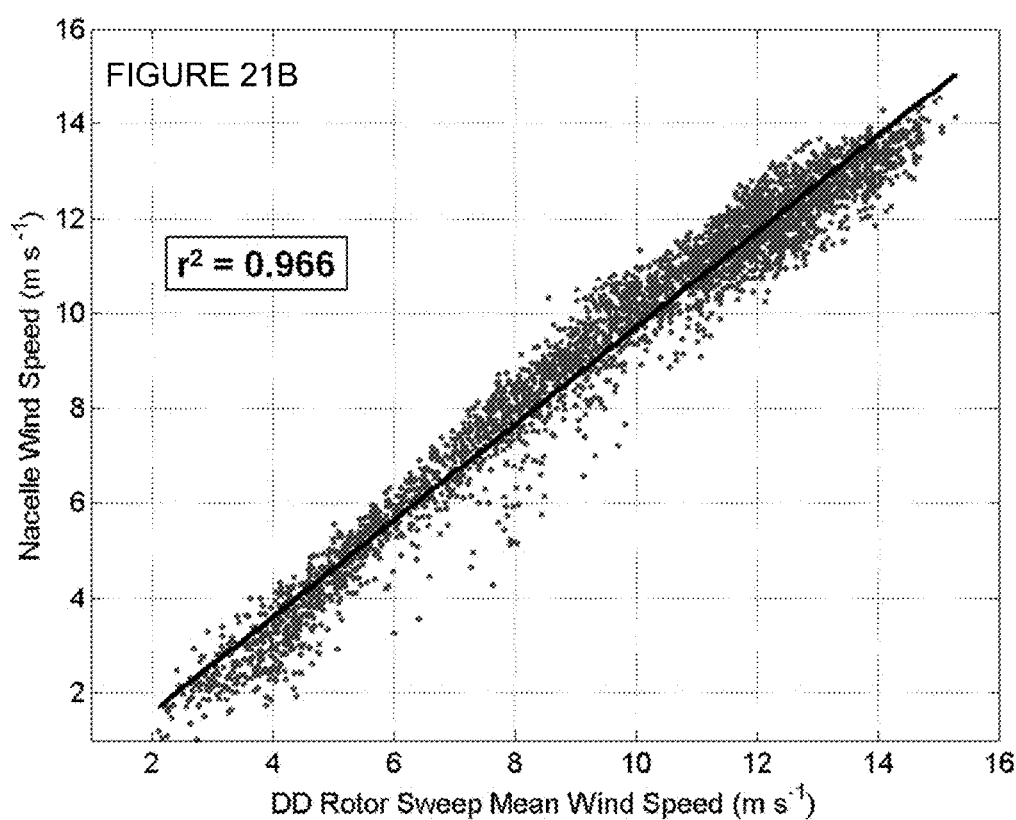

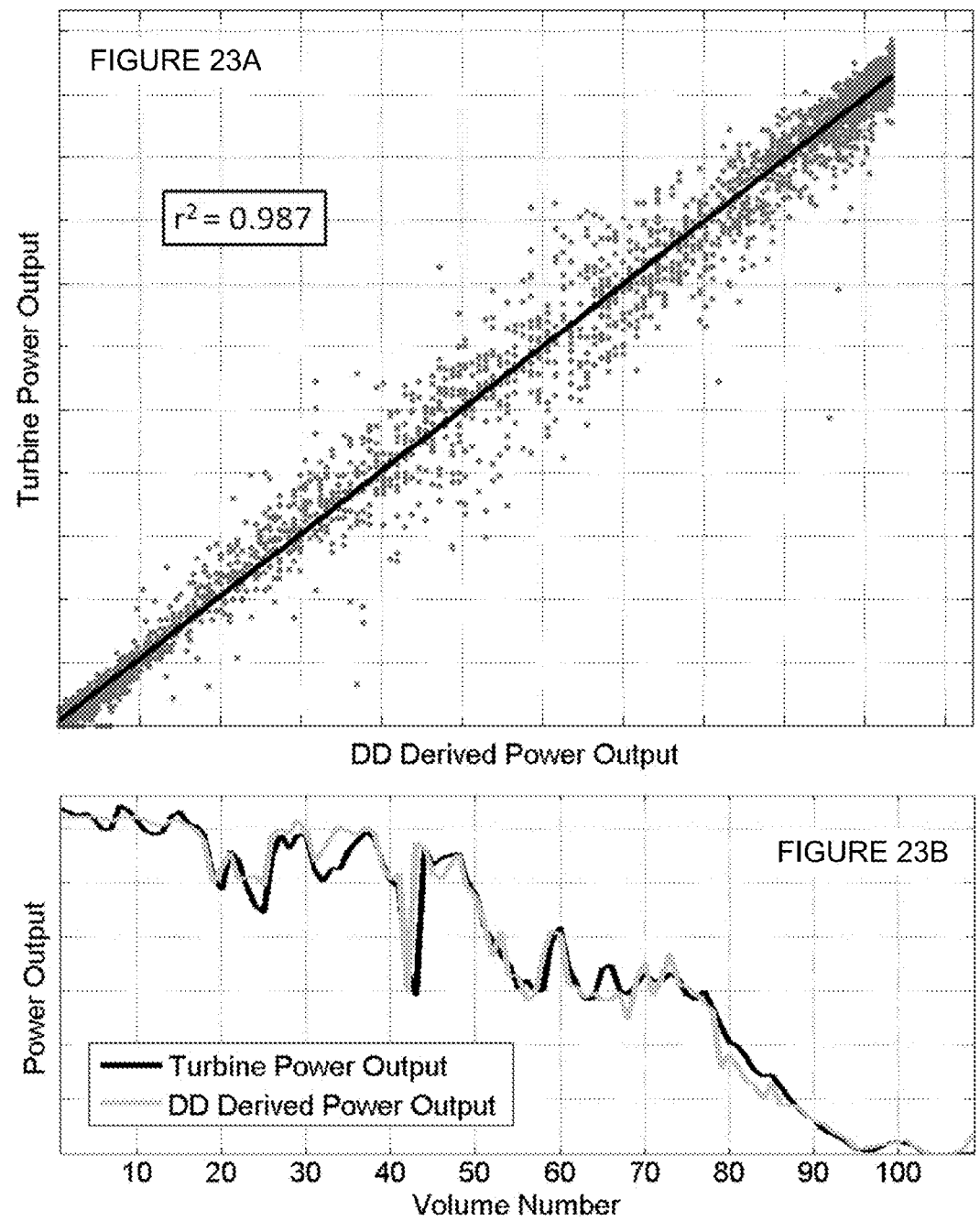

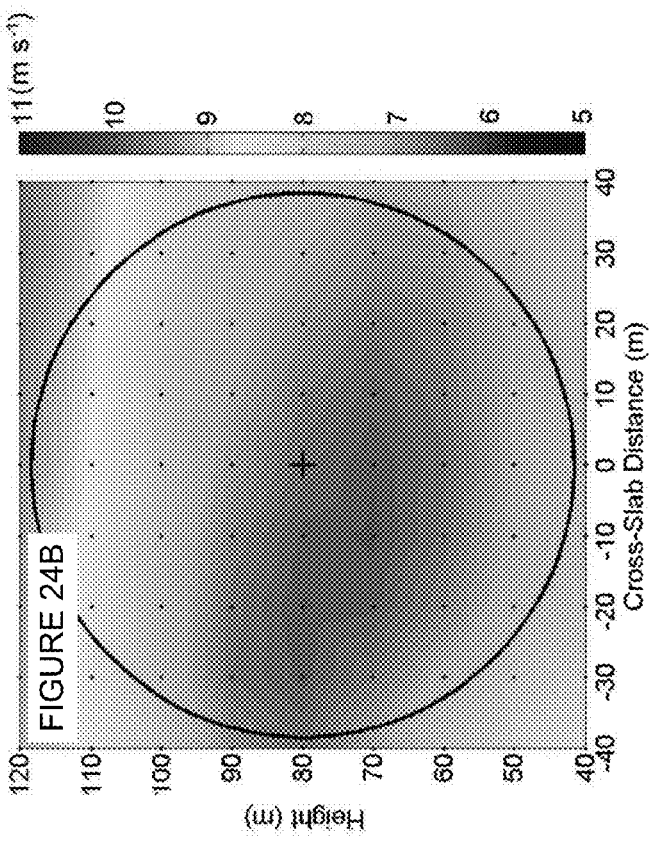
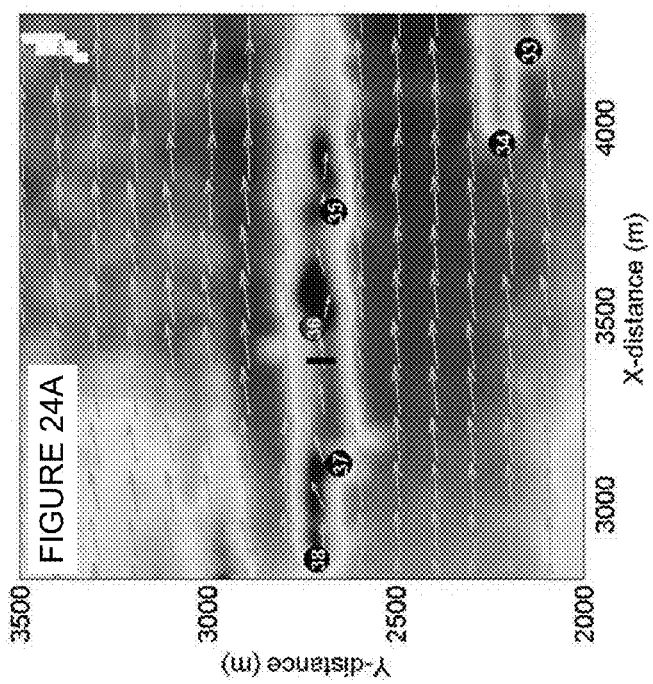
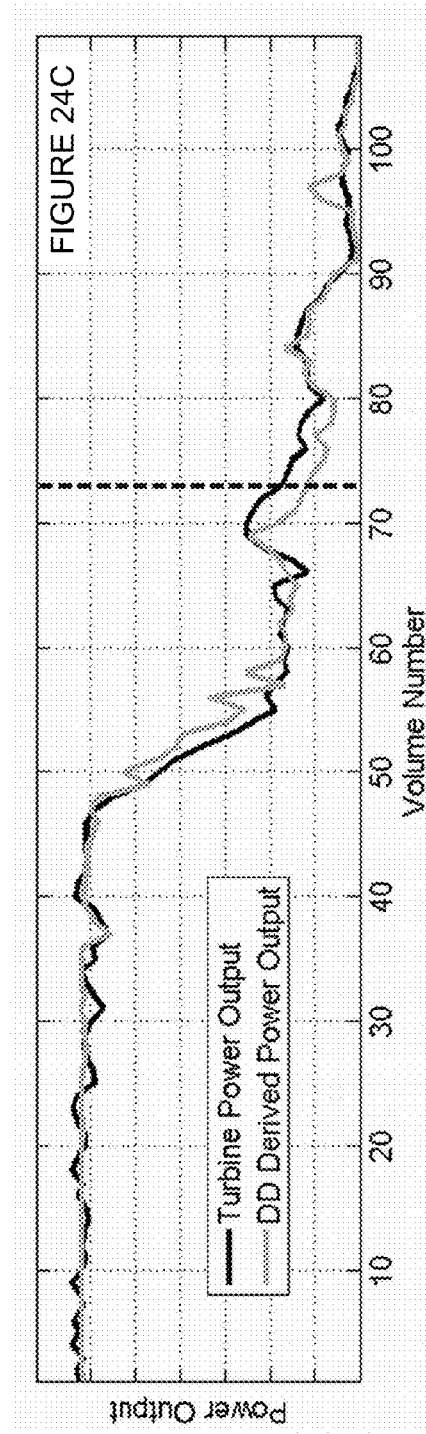

SYSTEM AND METHOD FOR EVALUATING WIND FLOW FIELDS USING REMOTE SENSING DEVICES

PRIORITY CLAIM AND CROSS-REFERENCE TO RELATED APPLICATIONS

This application claims priority to U.S. Provisional Patent Application Ser. No. 61/676,394, filed on Jul. 27, 2012 and U.S. Provisional Patent Application Ser. No. 61/683,022, filed on Aug. 14, 2012, the entire contents of which are incorporated herein by reference.

This application is related to U.S. patent application Ser. No. 13/952,611 filed on Jul. 27, 2013, PCT Patent Application No. PCT/US2013/052435 filed on Jul. 27, 2013, and PCT Patent Application No. PCT/US2013/052434 filed on Jul. 27, 2013.

STATEMENT OF FEDERALLY FUNDED RESEARCH

This invention was made with government support under Grant No. DE-FG-06-G086092 awarded by the United States Department of Energy Congressionally Directed Project: Great Plains Wind Power Test Facility. The government has certain rights in the invention.

FIELD OF THE INVENTION

The present invention relates generally to the field of remote sensing systems and, more particularly, to a system and method for evaluating wind flow fields using remote sensing devices.

BACKGROUND OF THE INVENTION

Wind turbine wakes are partly responsible for what is commonly referred to as the "underperformance" of wind farms by 10-20% [1-4, 27]. This "underperformance" can be in part attributed to shortcomings in the current power output models to accurately replicate turbine wakes and modulated flow fields throughout a wind farm. Wakes represent an extraction of energy from the free-stream flow that may become inflow for a downstream turbine, depending on the wind direction. Additionally, enhanced turbulence contained within wakes can create increased fatigue loading on downstream turbines [5-7]. Poor understanding of the modulated flows through wind farms leads to uncertainty in optimizing wind farm design and layout [11-12]. As wind farms grow to include more turbines both onshore and offshore, these inter-farm flows and their effects become more complex. As a result, reducing the cost of wind energy through the optimization of wind farm layout and operations demands a full understanding of turbine wake behavior [8-12], including assessing overall wake length and meandering characteristics [12-13, 28] in a variety of atmospheric conditions.

Full-scale observations of the flow through a wind farm are exceedingly limited in quantity and spatial coverage. Supervisory Control and Data Acquisition (SCADA) and individual meteorological tower measurements have provided valuable information related to wind speed deficits within turbine wakes but primarily represent isolated point measurements [1-2, 27] with a course temporal resolution of 10 minutes. Remotely sensed wake observations using scanning LIDAR provide a nearly continuous horizontal flow field, but to date have generally been limited to a maximum range of only a few kilometers while focused only on a single wake [16-18, 33-34]. Typical turbine spacing for existing utility-scale wind farm deployments is 7-10 rotor diameters (D) [3] coinciding with expected typical wake lengths. Although seemingly an extreme case, recent remote sensing observations have traced the length of a single turbine wake beyond 30 D [15].

The need for comprehensive full-scale measurements from within wind farms is well advertised by the wake modeling community to validate and improve current model schemes [1-2, 29-31], including wake behavior in complex terrain [32]. Accordingly, there is a need for a system and method to more accurately evaluate wind flow upstream, downstream and/or within wind farms to provide better optimization of wind farm layouts and operations.

SUMMARY OF THE INVENTION

The present invention provides a system and method to more accurately evaluate wind flow upstream, downstream and/or within wind farms to provide better optimization of wind farm layouts and operations. Although existing full-scale observations of turbine wakes are exceptionally limited, advances in remote sensing technologies provide optimism that the data required for model validation will soon be collected [15-18]. The analyses presented herein represent the first known effort to employ dual-Doppler (DD) syntheses to evaluate the structure of a turbine wake using mobile, research-grade Doppler radars. Note that other types of radar, other types of remote sensing technology (e.g., LIDAR) and other technologies developed in the future can be used in the place of Doppler radar. These results are expected to serve as a catalyst for future wake observations and simulation improvements, leading to optimized wind turbine layouts, refined design of control systems, and development of "smart" wind farms to help reduce the cost of energy.

More specifically, the present invention provides a method for obtaining data to determine one or more characteristics of a wind field by providing a first remote sensing device and a second remote sensing device, collecting coordinated data from the first remote sensing device and the second remote sensing device, and determining the one or more characteristics of the portion of the wind field by analyzing the coordinated data using one or more processors. The first remote sensing device is positioned to have a portion of the wind field within a first scanning sector of the first remote sensing device. The second remote sensing device is positioned to have the same portion of the wind field within a second scanning sector of the second remote sensing device.

In addition, the present invention provides a method for determining one or more characteristics of a wind field by providing coordinated data from a first remote sensing device and a second remote sensing device positioned to scan a portion of the wind field, and determining the one or more characteristics of the portion of the wind field by analyzing the coordinated data using one or more processors.

Moreover, the present invention provides a system for obtaining data to determine one or more characteristics of a wind field that includes a first remote sensing device, a second remote sensing device, and one or more processors that collect coordinated data from the first remote sensing device and the second remote sensing device, and determine the one or more characteristics of a portion of the wind field by analyzing the coordinated data using one or more processors. The first remote sensing device is positioned to have a portion of the wind field within a first scanning sector of the first remote sensing device. The second remote sensing device is positioned to have the portion of the wind field within a second scanning sector of the second remote sensing device.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIGS. 1A and 1B are various views of a dual-Doppler radar deployment with respect to a wind turbine in accordance with one embodiment of the present invention;

FIG. 12A shows the zoomed DD horizontal wind speed (m s$^{-1}$) at hub height (80 m) from a single volume at 1559 UTC (Volume 24) on 6 Jun. 2012 in accordance with one embodiment of the present invention;

FIGS. 12B-12C show the vertical cross-section of horizontal wind speed (m s$^{-1}$) along the plane represented by the dashed magenta line (FIG. 12B) and the dashed gray line (FIG. 12C) in FIG. 12A in accordance with one embodiment of the present invention;

FIG. 12D shows the vertical profiles of horizontal wind speed for various locations within the wind field as denoted by the squares in FIG. 12A in accordance with one embodiment of the present invention;

FIG. 13A shows the zoomed DD horizontal wind speed (m s$^{-1}$) at hub height (80 m) from a single volume at 1602 UTC (Volume 27) on 6 Jun. 2012 in accordance with one embodiment of the present invention;

FIGS. 13B-13C show the vertical cross-section of horizontal wind speed (m s$^{-1}$) (FIG. 13B) and the elevation (FIG. 13C) along the plane represented by the dashed magenta line in FIG. 13A in accordance with one embodiment of the present invention;

FIG. 13D shows the vertical profiles of horizontal wind speed for various locations within the wind field as denoted by the squares in FIG. 13A in accordance with one embodiment of the present invention;

FIG. 14A shows the composite zoomed DD horizontal wind speed (m s$^{-1}$) at hub height (80 m) from 1559-1609 UTC (Volumes 24-34) on 6 Jun. 2012 in accordance with one embodiment of the present invention;

FIGS. 14B-14C show the vertical cross-section of horizontal wind speed (m s$^{-1}$) (FIG. 14B) and the elevation (FIG. 14C) along the plane represented by the dashed magenta line in FIG. 14A in accordance with one embodiment of the present invention;

FIG. 14D shows the vertical profiles of horizontal wind speed for various locations within the wind field as denoted by the squares in FIG. 14A in accordance with one embodiment of the present invention;

FIG. 15A shows a ten-minute composite DD wind speed at hub height (80 m) from 1559-1609 UTC (Volumes 24-34) on 6 Jun. 2012 overlayed by six vertical cross-section reference lines in accordance with one embodiment of the present invention;

FIGS. 18A-18B show the zoomed domain of DD horizontal wind speed (m s$^{-1}$) from 1559 UTC (Volume 24) (FIG. 18A) and 1615 UTC (Volume 41) (FIG. 18B) in accordance with one embodiment of the present invention;

FIG. 18C shows a power output time history for Turbines 47, 48, 49 and 57 in accordance with one embodiment of the present invention;

FIG. 19A shows the zoomed domain of DD horizontal wind speed (m s$^{-1}$) from 1554 UTC (Volume 20) at hub-height (80 m) with reference line (solid black) to the vertical cross-section 1 D upwind of Turbine 56 in accordance with one embodiment of the present invention;

FIG. 19B shows the wind speed vertical cross-section 1 D upwind of Turbine 56 showing the rotor sweep and DD analysis domain gridpoints in accordance with one embodiment of the present invention;

FIG. 21A is a scatter plot of the DD upwind hub height wind speed (m s$^{-1}$) in accordance with one embodiment of the present invention;

FIG. 21B is a scatter plot of the DD rotor sweep mean wind speed (m s$^{-1}$) versus nacelle wind speed (m s$^{-1}$) in accordance with one embodiment of the present invention;

FIG. 23A is a scatter plot of DD-derived power output versus actual turbine power output with linear regression analysis in accordance with one embodiment of the present invention;

FIG. 23B is a time history comparison of actual turbine power output and DD-derived power output for Turbine 45 in accordance with one embodiment of the present invention;

FIG. 24A is a zoomed domain of DD horizontal wind speed (m s$^{1}$) from 1647 UTC (Volume 73) at hub-height (80 m) with reference line (solid black) to the vertical cross-section 1 D upwind of turbine 36 in accordance with one embodiment of the present invention;

FIG. 24B is a wind speed vertical cross-section 1 D upwind of turbine 36 showing the rotor sweep and DD analysis domain gridpoints in accordance with one embodiment of the present invention;

FIG. 24C is a time history comparison of actual turbine power output and DD-derived power output for Turbine 36 in accordance with one embodiment of the present invention;

DETAILED DESCRIPTION OF THE INVENTION

Figures 2A, 2B, 2C, 2D:
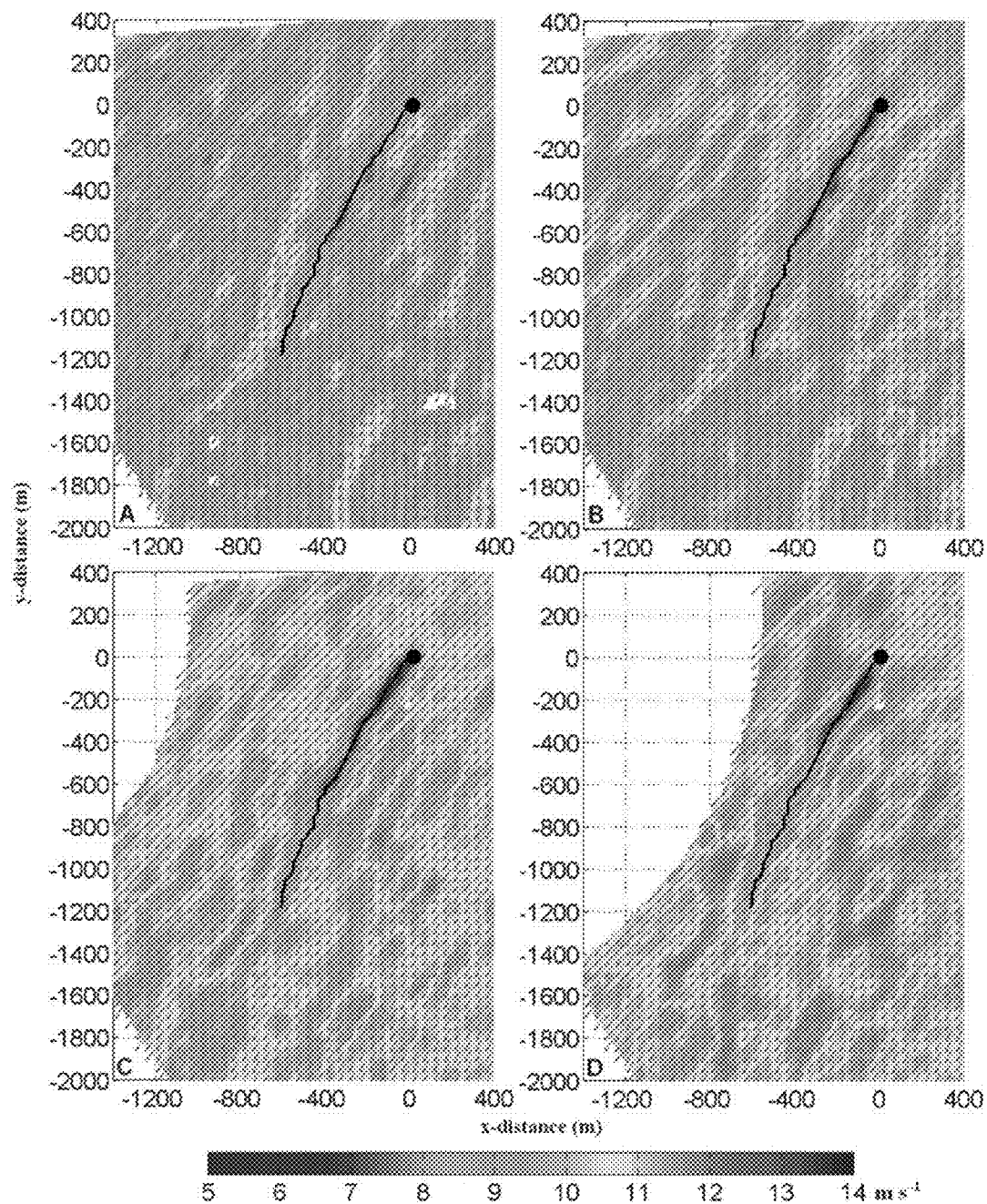
FIGS. 2A-2D show the TTUKa dual-Doppler synthesized horizontal wind speed (m s$^{-1}$) on at (A) 40 m AGL, (B) 60 m AGL, (C) 80 m AGL, and (D) 100 m AGL in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to wind flows in the vicinity of wind farms, but it will be understood that the concepts of the present invention are applicable to evaluating wind flows in and around other areas of interest. Moreover, the discussion relates to examples using mobile Doppler radar units, but it will be understood that the concepts of the present invention are applicable to other types of radar, other types of remote sensing technologies (e.g., LIDAR) and other technologies developed in the future (fixed, mobile or both).

The present invention provides a complete three-dimensional wind field defined with sufficient resolution to document flow field perturbations of importance to wind turbine response. From the generated fields, modulated flow fields within a wind farm can be documented, available power can be estimated, the vertical profile of wind across the rotor sweep can be identified, areas of enhanced turbulence can be tracked in time, and localized events (such as a thunderstorm outflow) can be proactively recognized. As a result, the present invention can be used to document wind turbine wakes for different manufacturers, enhance power performance testing (i.e. more comprehensive documentation of inflow conditions relative to turbine power generation), enhance wind farm turbine layout (existing commercial codes are based on assumptions which this technology can validate in full scale), and for site specific resource assessment (defining localized wind flow prior to or after turbine deployment). Other uses may include wind turbine and wind farm performance optimization including the development of "smart" wind farms based on integrating the generated flow and power fields into turbine and wind farm controls, mitigation of turbine loads through anticipatory control based on the remotely sensed flow and turbulence fields. The techniques described herein can be used to help lower the cost of wind energy through optimized wind turbine/farm performance and enhanced reliability.

Note, however, that the present invention can provide a more general usage toward documenting "complex flows," such as those induced by local terrain. The wind mapping capabilities will also allow for a wind farm operator to make anticipatory control decisions. For instance, if a thunderstorm outflow is pushing into the wind farm from a given direction, the wind mapping capability will reveal the outflow and allow the wind farm to make smart decisions proactively instead of reactively. Some specific examples of how the present invention can be implemented and used with respect to wind farms will now be described to better illustrate the present invention without limiting the scope of the present invention.

High spatial and temporal resolution radial velocity measurements surrounding a single utility-scale wind turbine were collected using the Texas Tech University Ka-band mobile research radars. Dual-Doppler (DD) synthesis was constructed using the coordinated measurements of two Doppler radars, allowing for three dimensional wind flow analysis within and surrounding a single utility scale wake [36]. In these radar studies, wake lengths were subjectively tracked to near 30 rotor diameters (D) downwind, which far exceeds the typically employed turbine spacing of 7-10 rotor diameters, while wind speed deficits were objectively assessed within a single wake at various downwind distances out to 15 D. The mean horizontal wind speed deficits found within the turbine wake region relative to the free-stream flow were related to potential reductions in the available power for a downwind turbine. Mean wind speed reductions of 17.4% were found at 7 rotor diameters downwind, corresponding to a potential power output reduction of 43.6% (38.2%). Likewise, mean wind speed reductions of 14.8% were found at 10 rotor diameters downwind, corresponding to a potential power output reduction of 38.2%. The wind speed deficits found within the wake also exhibit large variability over short time intervals; this variability would appreciably impact the inflow of a downstream turbine.

Texas Tech University (TTU) maintains two research-grade mobile Ka-band (35 GHz) Doppler radar systems using a non-linear pulse compression frequency modulation technique [36] (hereafter referred to as "TTUKa"). These systems provide excellent spatial resolution for each individual sample volume (or bin) with a half-power beamwidth of 0.49° in the azimuthal/elevation dimension and an along beam range resolution of 15 m. The TTUKa radars utilize a solid state traveling wave tube amplifier which emits a coherent pulse. Utilizing both the coherency and amplification capabilities of the transmitter allows for the creation of an engineered pulse using sophisticated pulse compression techniques [19-20]. Relatively long pulse widths can be used (12-80 µs), which increases sensitivity while retaining excellent along-beam spatial resolution. Additional information on the use of a single radar unit can be found in B. Hirth, J. Schroeder, W. Gunter, J Guynes, "Measuring a Utility-Scale Turbine Wake Using the TTUKa Mobile Research Radar", J. Atmos. Oceanic Technol., 29, 765-771 (2012), which is incorporated herein by reference in its entirety.

Now referring to FIGS. 1A and 1B, various views of the dual-Doppler radar deployment with respect to a wind turbine in accordance with the present invention are shown. FIG. 1A is an elevation view showing the lower and upper beam heights originating from a first Doppler radar (TTUKa1) at the location of the turbine and at 5 km range. FIG. 1B is a plan view of the dual-Doppler deployment and respective 30° scanning sectors from each radar. The dual-Doppler domain is characterized by the overlapping sectors. The location of the turbine and primary wind direction are also shown.

More specifically, a first remote sensing device (e.g., TTUKa1) is positioned to have a portion of the wind field disposed within a first scanning sector of the first remote sensing device, and a second remote sensing device (e.g., TTUKa2) is positioned to have the portion of the wind field disposed within a second scanning sector of the second remote sensing device. One or more processors (e.g., instruments, computers, etc.) collect a coordinated data from the first remote sensing device and the second remote sensing device and determine the one or more characteristics of the portion of the wind field by analyzing the coordinated data using the one or more processors On 27 Oct. 2011, the TTUKa radars were deployed in the vicinity of a single utility-scale wind turbine [15] as shown in FIGS. 1A and 1B. The turbine possessed a hub height of 80 m and a rotor diameter of 86 m. A single turbine was selected (as opposed to a multiple turbine wind farm) to serve as a benchmark study and allow for a comprehensive investigation of the mean structure and evolution of a single wake. The first Doppler radar (TTUKa1) was located 2.7 km upwind of the turbine while the second Doppler radar (TTUKa2) was positioned 2.6 km west of the turbine. Both radars performed coordinated data collection over a 54 minute period scanning 10 elevation angles between 0.6° to 2.4° in 0.2° increments over a 30° sector. Each complete set of 10 scans, or volume, took approximately 45 seconds to complete. This coordinated data collection yielded 72 consecutive volumes of dual-Doppler (DD) synthesized horizontal wind flow describing the turbine wake and surrounding free-stream flow. Beyond the 54-minute coordinated scanning period, each radar conducted additional independent scanning that is not conducive for DD synthesis.

In this specific example, raw binary data collected by each TTUKa radar system were generated using the Sigmet, Inc., Radar Video Processor 9 signal processor. The Sigmet "IRIS" software package was used to convert raw data to Universal Format (UF). Once these UF data were extracted from the radar computer, they were converted to Doppler Radar Data Exchange (DORADE) format using the National Center for Atmospheric Research (NCAR) developed 'xltrsii' translator. The DORADE sweep files were then edited using the NCAR "SOLOII" software package. For this study, minimal editing was necessary due to the high data quality and relatively low wind speeds (i.e. unfolding was not necessary). Following editing, complete volumes comprised of multiple sweep files from both radars were interpolated from their native polar coordinate space to a Cartesian grid using the NCAR "REORDER" software package. The complete grid used for this study was 3 km×3 km×150 m, with 10 m grid spacing in both the horizontal and vertical directions. Data were interpolated using the Barnes (exponential) weighting scheme [26] with a radius of influence of 25 m in the horizontal plane and 15 m in the vertical direction. The REORDER Barnes weighting function was set to −2.3. Because the minimum (maximum) elevation scan used for both radars was 0.6° (2.4°), gridded data generally were not present below (above) 30 m (120 m) through relevant portions of the gridded domain. Final gridded data from REORDER were output in a binary format specifically prepared for the NCAR Unix-based Custom Editing and Display of Reduced Information in Cartesian space (CEDRIC) software package in preparation for dual-Doppler synthesis. CEDRIC was used to generate U and V horizontal wind velocity components for each grid point. Synthesized data were only considered valid at a given grid point if the beam crossing angle was between 30° and 150°. The final synthesized output from CEDRIC was in the Network Common Data Form (NetCDF) format. FIGS. 2A-2D show an example of a single-volume DD synthesis of the TTUKa dual-Doppler synthesized horizontal wind speed (m s$^{-1}$) at 40 m AGL (FIG. 2A), 60 m AGL (FIG. 2B), 80 m AGL (FIG. 2C), and 100 m AGL (FIG. 2D). The horizontal wind vectors are shown. The black dot represents the location of the turbine. The solid black line represents an algorithm-defined wake center to a distance of 15 D.

Figure 3A:
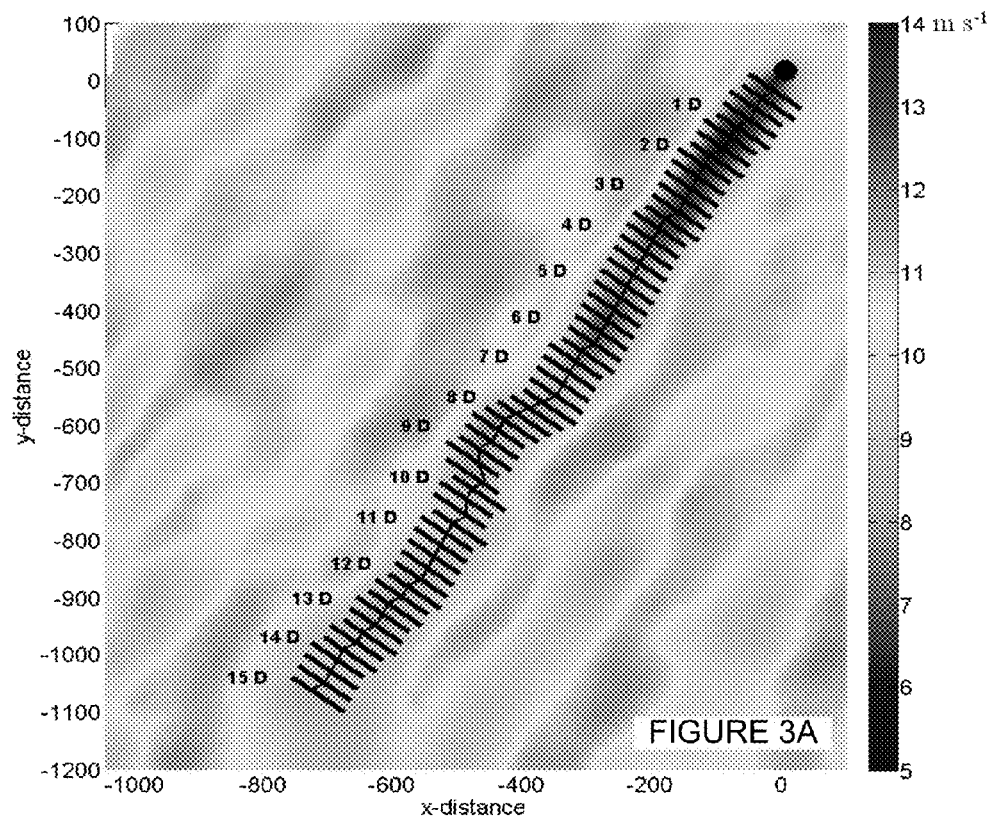
FIG. 3A shows an example of constant horizontal plane of dual-Doppler horizontal wind speed (m s$^{-1}$) at 80 m with the wake algorithm derived wake centerline and vertical cross-section slices in accordance with one embodiment of the present invention.
Figure 3B:
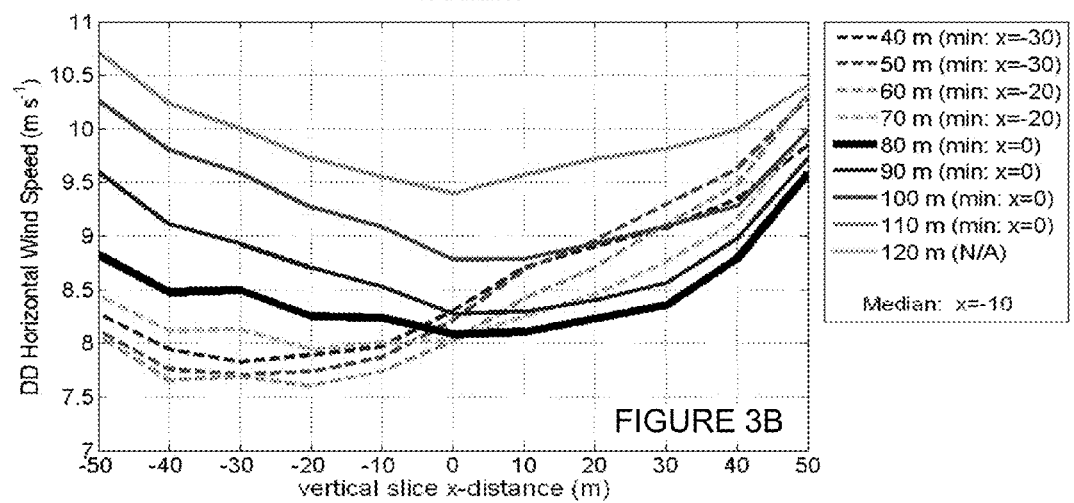
FIG. 3B shows the dual-Doppler horizontal wind speed cross-section slices at a downwind distance of 5 rotor diameters (D) between for the vertical levels between 40 and 110 m in accordance with one embodiment of the present invention.

The wake tracking algorithm will now be described. Due to variations in wind direction, wake orientation and spatial distribution (i.e., meandering), it was desirable to quantitatively define the wake center at incremental downwind distances from the turbine. Given the wake evolves with downwind distance in both the horizontal and vertical dimensions, it was necessary to incorporate data from multiple vertical levels (as opposed to just considering 80 m, or hub height) across the rotor sweep. A wake center point was defined at 0.25 D increments from 0.25 D to 15 D. First, a mean domain wind direction was acquired or calculated for each DD volume using all available volume grid points, and all wake cross sections were oriented normal to this value with a 100 m horizontal width (±50 m of the defined wake center). Because wake width varies with downwind distance, the defined cross section does not always transect the entire wake. Rather, the cross section is centered on the minimum wind speed assumed to be associated with the center of the wake. As shown in FIGS. 3A-3B, all cross-sections through the wake were oriented normal to this mean wind direction, and were 110 m wide horizontally. FIG. 3A shows an example of constant horizontal plane of dual-Doppler horizontal wind speed (m s$^{-1}$) at 80 m with the wake algorithm derived wake centerline and vertical cross-section slices in accordance with the present invention. FIG. 3B shows the dual-Doppler horizontal wind speed cross-section slices at a downwind distance of 5 D between for the vertical levels between 40 and 110 m in accordance with the present invention. The median location of the minimum horizontal wind speed for all contributing heights in this cross-section was x=−10 m.

The first cross-section at 0.25 D was horizontally centered on the turbine at a downwind bearing equal to the domain mean wind direction. For each successive cross-section (every 0.25 D), the dual-Doppler horizontal wind speed was assessed across the width of the vertical slice at levels between 40 and 120 m (approximately the depth of the rotor sweep), where data were available. The horizontal (x-distance (d)) location of the minimum wind speed was tabulated for each height. The median horizontal location from all contributing vertical levels was set as the center point for the next incremental vertical cross-section. For this study, it was found that the algorithm performed well to a downwind distance of 15 D for all 72 volumes. In general, beyond 15 D the wind speed deficits associated with the turbine wake and surrounding free-stream flow variability due to the inherent rolls/streaks [21-23] were similar, causing the algorithm to perform less effectively.

Figures 4A, 4B, 4C, 4D:
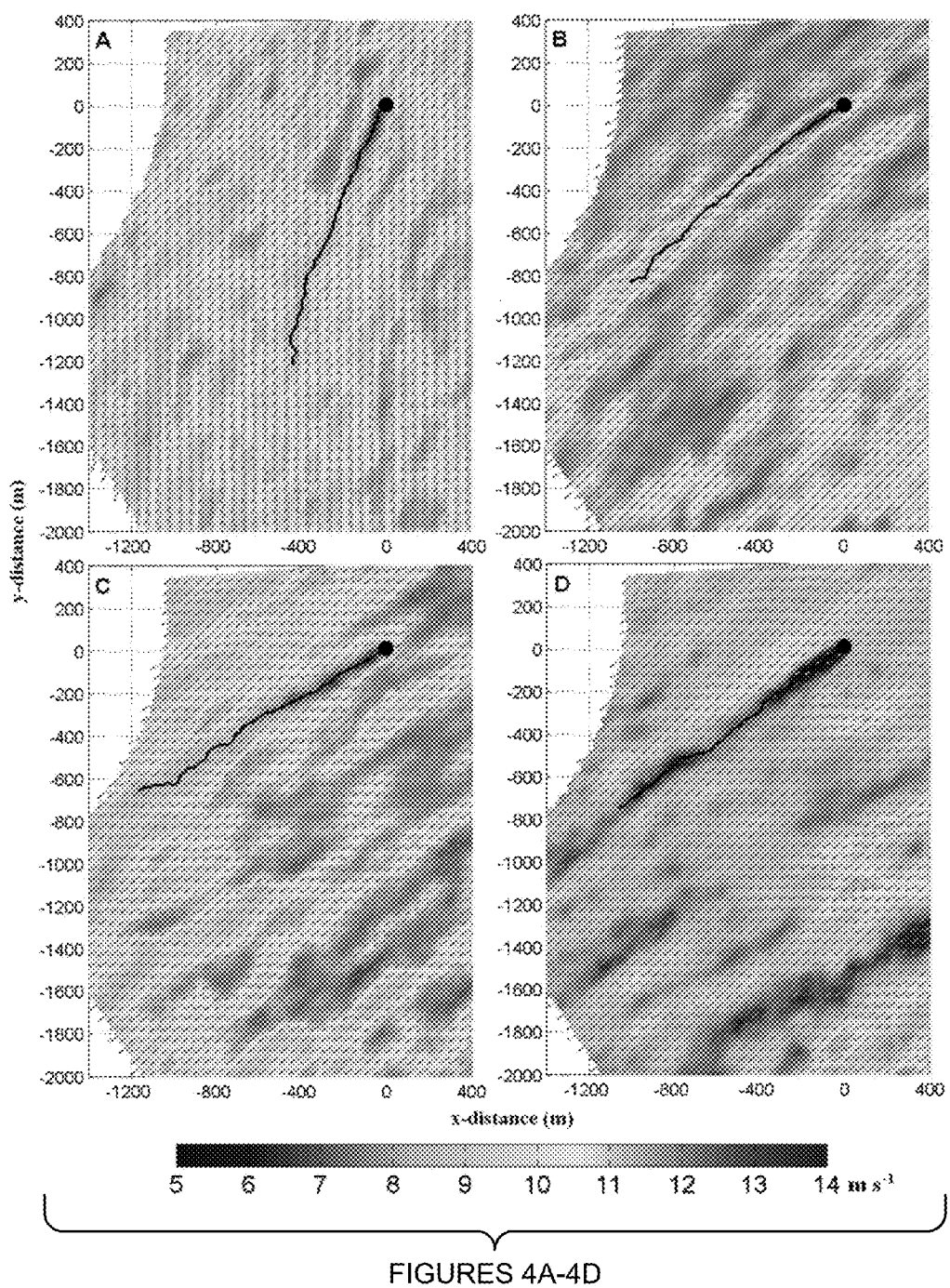
FIGS. 4A-4D show the TTUKa dual-Doppler synthesized horizontal wind speed (m s$^{-1}$) on 27 Oct. 2011 at 80 m AGL for (A) 1233 UTC, (B) 1241 UTC, (C) 1304 UTC, and (D) 1317 UTC in accordance with one embodiment of the present invention.
Figures 5A, 5B, 5C, 5D, 5E, 5F:
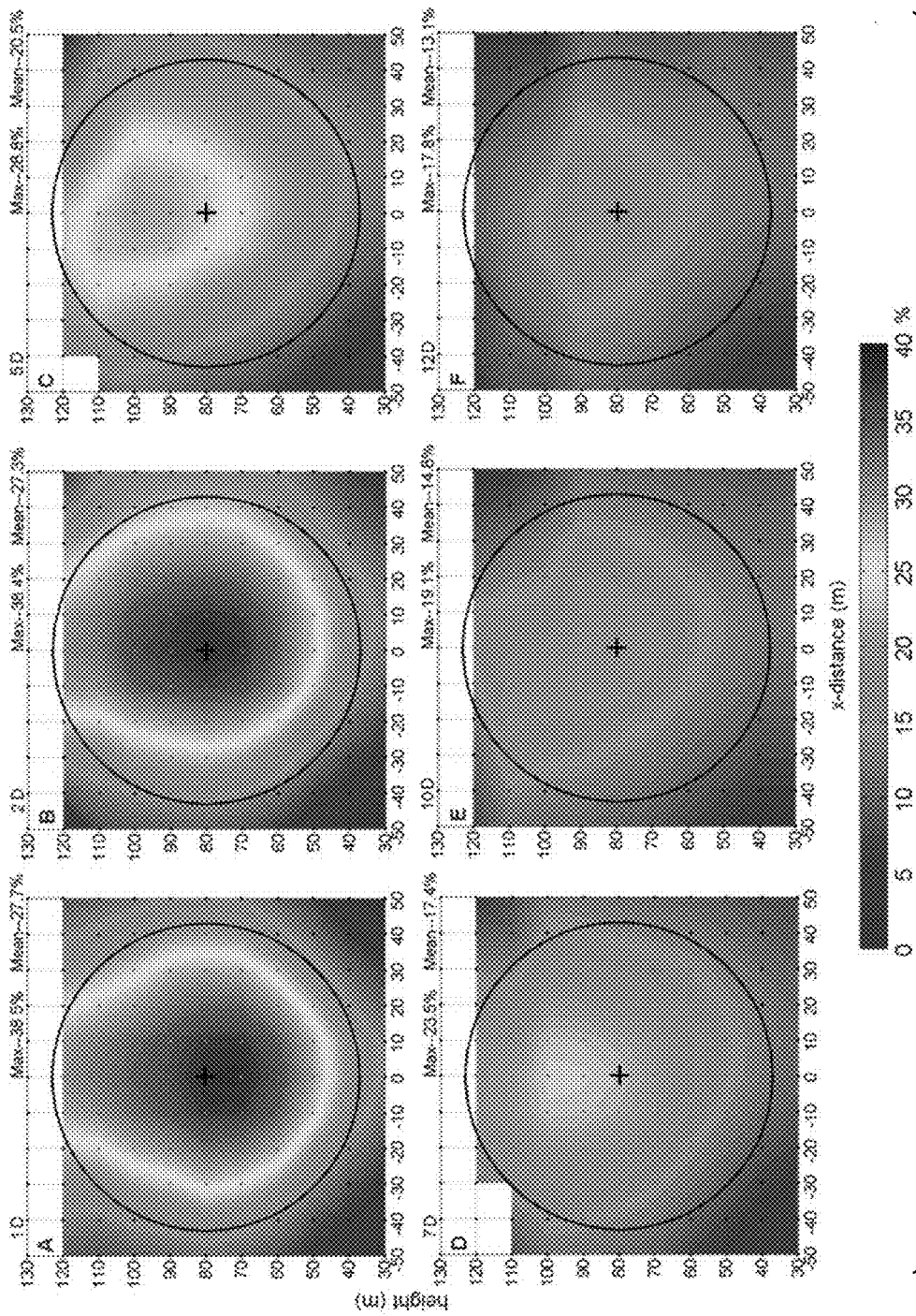
FIGS. 5A-5F are vertical slices of the reduction (%) in horizontal wind speed within the wake composited from 72 dual-Doppler volumes at (A) 1 D, (B) 2 D, (C) 5 D, (D) 7 D, (E) 10 D, and (F) 12 D downwind in accordance with one embodiment of the present invention.

During the 54-minute data collection period, the dual-Doppler-derived domain mean wind speed and direction varied considerably as shown in FIGS. 4A-4D, which show the TTUKa dual-Doppler synthesized horizontal wind speed (m s$^{-1}$) on 27 Oct. 2011 at 80 m AGL for 1233 UTC (FIG. 4A), 1241 UTC (FIG. 4B), 1304 UTC (FIG. 4C), and 1317 UTC (FIG. 4D). The horizontal wind vectors are shown. The black dot represents the location of the turbine and the solid black line denotes the algorithm defined wake center to a distance of 15 D. At hub height (80 m), the domain averaged wind speed evaluated for each dual-Doppler volume ranged from 8.5 m s$^{-1}$ to 11.3 m s$^{-1}$, corresponding to region two on the power curve of this particular turbine (i.e., where power output depends on wind speed and is below the rated power for the turbine). The domain mean wind direction veered from 16° to 62°, resulting in a large variability in wake orientation. The discernible length of the wake also varied on short time scales. At times, the wake visually (subjectively) appeared to extend beyond the dual-Doppler analysis domain, a length greater than 20 D (see FIG. 4B). To account for the combined effect of wake orientation differences and wake meandering, a simple wake tracking algorithm was developed to identify the horizontal center of the wake at distances up to 15 D downstream of the turbine. As will be described in more detail below, this algorithm took vertical cross-sections through the wake and examined the horizontal wind speeds at various heights within the wake, extracting the mean horizontal position of the wind speed minimum as the wake center. In general, beyond 15 D, the visual character of the wake began to scale with the free-stream boundary layer wind speed heterogeneity (e.g., FIG. 4A). This heterogeneity has often been associated with atmospheric boundary layer rolls or streaks [21-23] which represent local areas of atmospheric mixing. The interaction of these boundary layer features with an existing wake is confirmed by these analyses; however the role that these coherent features play in modulating wake structure remains to be further studied.

Data collected from all 72 volumes are composited using a wake-relative orientation to assess the ensemble averaged wake structure as a deficit from the free-stream flow field. A mean free-stream wind profile is developed for each dual-Doppler volume by averaging a 1 km×1 km section of the dual-Doppler domain not impacted by the turbine wake. Using the algorithm determined wake center for each dual-Doppler volume, vertical cross-sections are developed through the wake at various downwind distances +/−50 m horizontally from the identified wake center. Vertical cross-sections from all 72 dual-Doppler volumes are then composited at each downwind increment. Each composited cross-section is presented as a percent reduction/deficit from the derived free-stream wind profile. FIGS. 5A-5F show vertical slices of the reduction (%) in horizontal wind speed within the wake composited from 72 dual-Doppler volumes at 1 D (FIG. 5A), 2 D (FIG. 5B), 5 D (FIG. 5C), 7 D (FIG. 5D), 10 D (FIG. 5E), and 12 D (FIG. 5F) downwind in accordance with the present invention. Domain grid points are shown, and magenta grid points represent those contained by the wake-relevant rotor sweep (solid black circle). The black plus sign represents the center of the turbine hub. The maximum and mean reduction values from the contributing rotor sweep grid points are annotated.

Using the grid points contained within the wake-relevant rotor sweep (black circle), a mean and maximum wind speed deficit (i.e., reduction in wind speed relative to the free-stream) is assessed for each downwind composite cross-section. The mean (maximum) wind speed deficit within the wake at 1 D is 27.7% (38.5%), at 7 D is 17.4% (23.5%), at 10 D is 14.8% (19.1%), and at 15 D is 11.5% (15.5%). For the first 10 D of distance immediately downwind of the turbine, the difference between the maximum and mean wind speed deficit converges with increasing distance and is 10.8% at 1 D, 6.1% at 7 D, and 4.3% at 10 D. For downwind distances beyond 10 D, this difference changes little, and is 4.0% at 15 D (FIG. 6) as mixing and entrainment reduce the peak wake deficits. The higher wind speed reductions associated with the wake are stretched upward in the gridded data fields, particularly where the reductions are most significant (e.g., FIGS. 3A-3B). This upward stretching is due to a lack of data above the 120 m level, such that larger deficit values are interpolated upwards during the coordinate space conversion process. This effect does not have a significant impact on the constructed analysis, and is estimated to induce a positive bias to the mean wind speed reduction behind the rotor sweep of no more than 0.5%.

The analyzed wind speed deficits in the wake are linked to the potential power deficits that a downwind turbine located within the wake might experience. To explore this impact, we focus on the mean wind speed deficit values within the wake-relevant rotor sweep. Within region two of a power curve, power output is proportional to the inflow mean wind speed cubed [24]. Note that the coefficient of power for the turbine studied was not available for use. All calculated power reductions are considered to be estimates that assume a constant coefficient of power across the range of documented wind speeds but are still believed to provide meaningful perspective. For example, at a downwind distance of 2 D, the composite mean wind speed reduction behind the rotor sweep is 27.3% relative to the free stream flow. The wind speed reduction corresponds to a potential power reduction for a turbine centered within this wake of 61.6% relative to the power output from a turbine experiencing the free stream flow. At a downwind distance of 7 D, the composite mean wind speed reduction is 17.4%, corresponding to a 43.6% decrease in potential power output. At 10 D downwind, the composite mean wind speed reduction is 14.8%, which is proportional to a potential decrease in power output of 38.2%. At 15 D, a mean wind speed reduction of 11.5% is observed, which yields a 30.6% decrease in potential power output. It is important to note that the turbulent character of the wake can vary significantly with downwind distance [6, 25], which can affect the relationship between wind speed and power output.

These initial results agree well with independent analyses using Supervisory Control and Data Acquisition (SCADA) data collected at the Middelgrunden offshore wind farm in Denmark [1]. This study compared data collected from the nacelles of a leading turbine and another turbine located 2.4 D downwind. For a well-aligned wind direction, the SCADA data showed a wind speed reduction within the wake center of roughly 30% at the location of the downwind turbine. Similar analysis from SCADA data at the Horns Rev offshore wind farm in Denmark showed a decrease in normalized power output of roughly 38% between a leading row turbine, and a turbine located 7 D downwind for a well aligned wind direction [2]. Meteorological tower data collected over a 5-year period at the Energy Research Center of the Netherlands Wind Turbine Test Site in Wieringermeer showed maximum velocity deficits within a wake to be 45% at 2.5 D and 35% at 3.5 D [27]. Maximum power loss between the first turbine and the second turbine (separated by 3.8 D) reached 67%. Although there are differences in turbine specifications, surface roughness, and atmospheric conditions associated with data collected from these previous studies and the single turbine examined herein, similar findings are shown using vastly different analysis methods.

Figure 6:
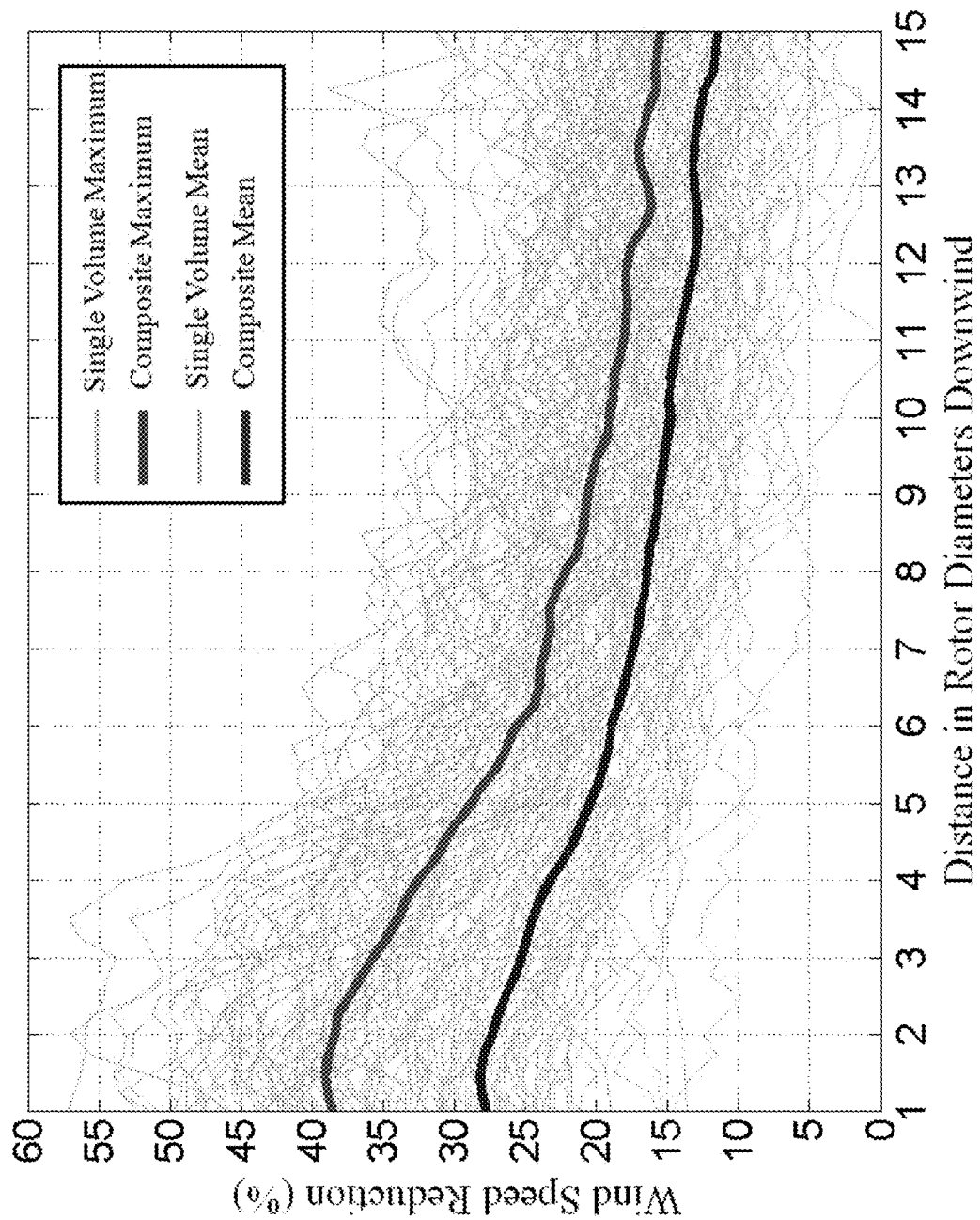
FIG. 6 shows horizontal wind speed reductions (%) within the wake at various downwind distances from the turbine relative to the free-stream flow field in accordance with one embodiment of the present invention.

Now referring to FIG. 6, horizontal wind speed reductions (%) within the wake at various downwind distances from the turbine relative to the free-stream flow field in accordance with the present invention are shown. Thin lines represent individual volume maximum and mean values. Bold lines indicate maximum and mean reduction composites from all 72 contributing dual-Doppler volumes. The collected data also reveal considerable variability between individual dual-Doppler synthesized deficits of horizontal wind speed within the wake. Maximum wind speed reductions in the wake within 4 D of the turbine exceeded 50% on several occasions during the collection period. At 2 D, the range in mean wind speed reduction behind the rotor sweep over the 72 contributing volumes is 32%. The spread reduces at 6 D to 20%. At 14 D, the spread increases again to 31%, which is speculated to be attributed to the effect of wake meandering. The mean range for all calculated downwind distances from 1 to 15 D is 26%. The net result to a downwind turbine could be a large variability in potential power output on very short time scales (within minutes).

Referring now to FIGS. 7-24, dual-Doppler (DD) measurements were collected within a utility-scale wind farm on 6 Jun. 2012 and will now be described as a non-limiting example of the present invention. Though a single radar can only resolve "line-of-sight" radial velocities, the combination of coordinated data from multiple radars with a sufficient look angle allows for the construction of a DD synthesized wind field. The full horizontal wind vector can therefore be produced. For two ground-based radar systems, a set of elevation scans (or volume) is required from each radar to resolve the flow through the depth of the rotor sweep or at hub height. Coordinated volumes are edited to remove the erroneous effects of stationary ground targets, interpolated into a three-dimensional Cartesian grid, overlaid in space, and undergo DD synthesis [35]. For this dataset, environmental wind speeds never exceeded the radar nyquist velocity (25.8 m s$^{-1}$), precluding the need for velocity unfolding. Grid spacing for the final DD domain was 10 m in all horizontal and vertical dimensions.

As previously described, both TTUKa radars are truck mounted, allowing for diverse data collection objectives. These systems provide excellent spatial resolution for each individual sample volume (or bin) with a half-power beamwidth of 0.49° in the azimuthal/elevation dimension and an along beam range resolution of 15 m. A fully coherent traveling wave tube amplifier (TWTA) generates the transmitted pulse which results in negligible velocity noise (error) in the returned signal since the transmitted pulse modulation index is phase locked at baseband before up conversion. The pulse compression technique utilizes a non-linear frequency chirp encompassed by an amplitude modulated envelope to produce a time elongated transmitted pulse by leveraging the available 50% duty cycle of the TWTA. Thus the increased timescale of the transmitted pulse, on the order of 12-80 μs, provides a substantial increase in system sensitivity while the reflection of the complex pulse in the frequency domain resides in minimal bandwidth (pulse compression) in order to produce excellent range resolution. The radars are capable of scanning horizontal plan-position indicator (PPI) scans at 30° s$^{-1}$ and vertical range-height indicator (RHI) scans at 6° s$^{-1}$. Only PPI scanning was used to construct complete DD data volumes through the depth of the rotor sweep for multiple turbines within a wind farm. The TTUKa technical specifications employed for the presented data collection are as follows:

| Parameter | Specifications |
| --- | --- |
| Peak Transmit Power | 212.5 W |
| Transmit Frequency | 35 GHz |
| Wavelength | 8.6 mm |
| Antenna Diameter | 1.22 m |
| Half-Power Beamwidth | 0.49° |
| dBZ$_0$ | −38.5 dBZ |
| Pulse Length | 20 μs |
| Range Gate Spacing | 15 m (9 m) |
| Pulse Repetition Frequency | 12,000 Hz |
| Maximum Range | 15 km |
| Azimuthal (PPI) Resolution | 0.352° |
| Pointing Accuracy | 0.05° |
| Velocity Accuracy | 0.03 m s$^{-1}$ |
| Horizontal Scan Speed | 30° s$^{-1}$ |

Both radars utilized a 20 μs compressed pulse and a pulse repetition frequency of 12,000 Hz.

Figure 7:
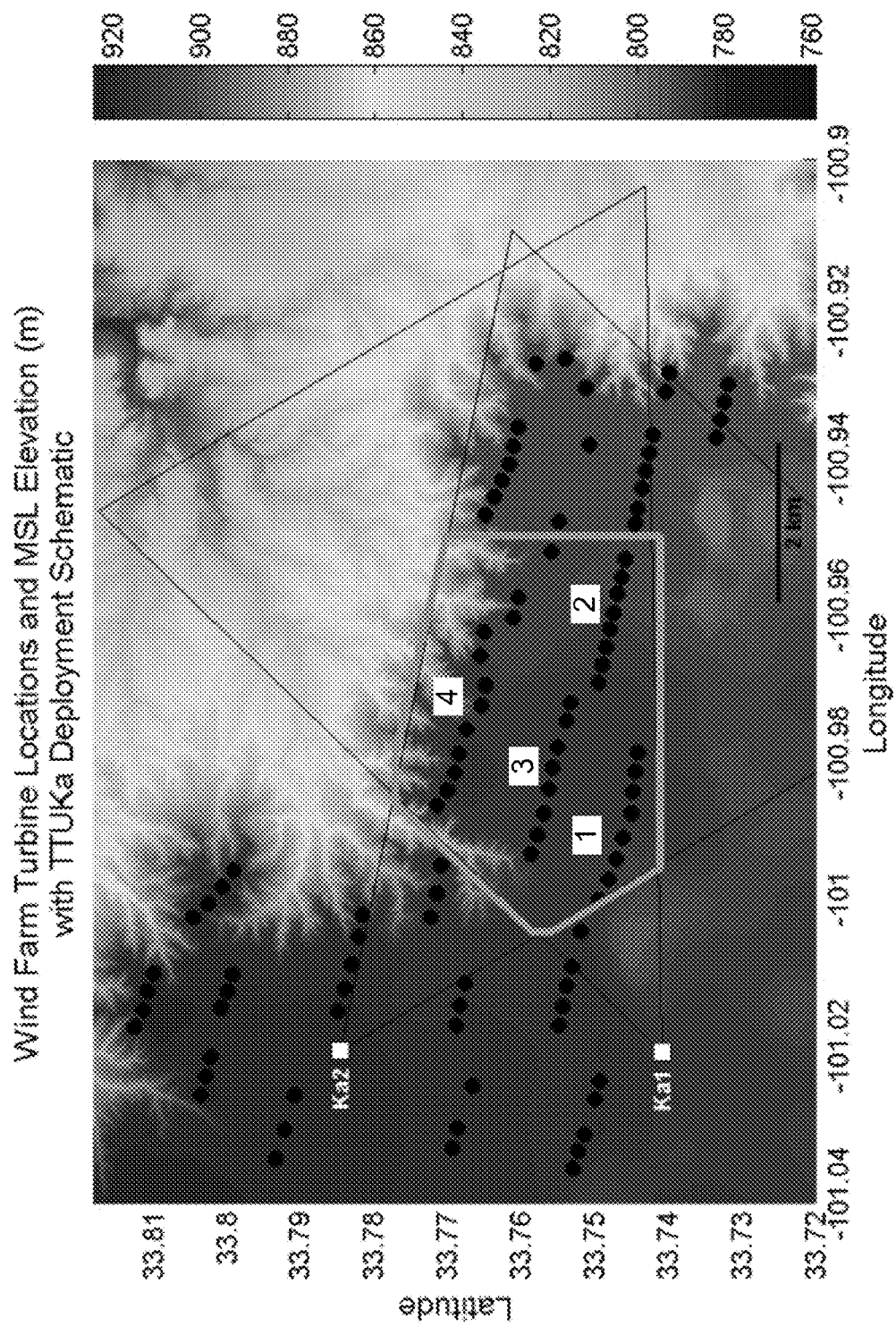
FIG. 7 shows the locations of the radar units and the turbines within a wind farm in accordance with another embodiment of the present invention.

Now referring to FIG. 7, the locations of the radar units and the turbines within a wind farm for the measurements taken on 6 Jun. 2012 are shown in accordance with another embodiment of the present invention. The locations of the turbines (black dots) and the locations of the deployed radars (white squares labeled Ka1 and Ka2) are overlaid on an elevation map. The radars were deployed with a north-south baseline 4.9 km in length and data collection from both radars was coordinated in time. The radars scanned a 50° sector using 15 elevation tilts (0.2-3.0°, incremented every 0.2°), which is referred to as an individual volume. Each volume took roughly one minute to complete. This dataset represents a collection of 109 consecutive volumes spanning 106 minutes. The final DD analysis domain was defined by the region where each radar sector overlapped (denoted by the bold green polygon), and where data were available through much of the turbine rotor sweep, horizontally covering roughly 17 km$^2$. The DD domain used for analysis contained four turbine rows (labeled 1, 2, 3 and 4 in FIG. 7), and included 36 operational utility scale turbines with a hub height of 80 m and rotor diameter of 77 m. Turbine spacing within the DD domain was 3-4 D in the along-row axis and 15-20 D between turbine rows. The range to the turbines was approximately 2.1 to 7.0 km. While it is acknowledged that atmospheric stability information is important to the analysis [37], data necessary to determine stability were not available. The radar measurements were collected through periods of light to moderate rainfall during the late morning hours so stable to near neutral conditions would have been expected.

Very little elevation change exists within the DD analysis domain; however, a significant (greater than 40 m) decrease in elevation was located downwind (north) of the fourth row of turbines (Row 4; FIG. 7). Ground elevation data from the National Elevation Dataset (NED; http://ned.usgs.gov/) were used to interpolate the DD horizontal wind field to a ground-relative representation. A one arc-second (about 30 m) horizontal resolution data raster was used for this study. For each horizontal gridpoint in the DD domain, the closest geo-referenced NED elevation raster value was assigned.

Figures 8A, 8B, 8C:
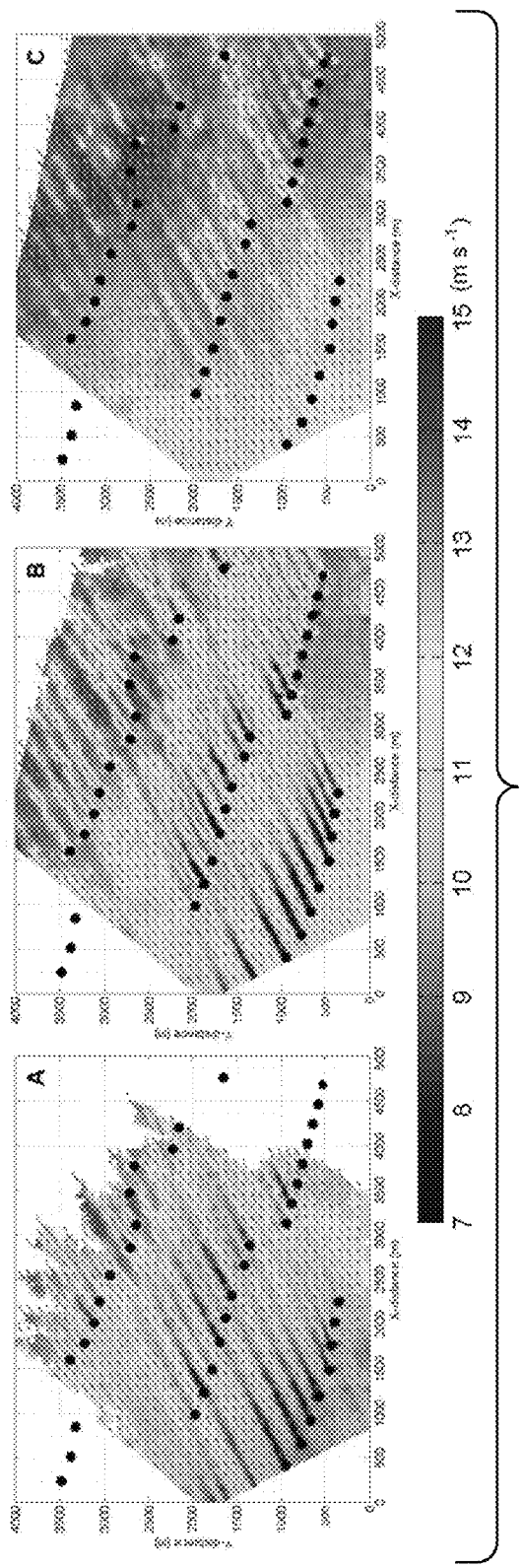
FIGS. 8A-8C show terrain-adjusted DD horizontal wind speed (m s$^{-1}$) synthesis for a single volume from 1559 UTC (Volume 24) on 6 Jun. 2012 at (A) 40 m, (B) 80 m, and (C) 120 m AGL in accordance with one embodiment of the present invention.

Terrain-relative wind maps are constructed on constant horizontal planes to assess horizontal complex flow variability. FIGS. 8A-8C show an example of the horizontal wind field from a single DD volume at 1559 UTC (Volume 24) for 40 m AGL (FIG. 8A), 80 m AGL (FIG. 8B), and 120 m AGL (FIG. 8C), representing the wind field near the bottom of the rotor sweep, hub height, and the top of the rotor sweep, respectively. Black dots represent turbine locations and wind vectors are overlaid. North is aligned with increasing Y-distance. For this volume, the wind direction is approximately perpendicular to the turbine rows, resulting in long individual wake structures. Wake occurrences can be seen at all three vertical levels presented, though they are much more pronounced at the bottom of the rotor sweep and at hub height when compared to the top of the rotor sweep. At hub height (FIG. 8B), turbine-to-turbine interaction is evident as wakes from the leading row of turbines clearly impact turbine inflow in the row downstream.

Between individual wakes, channels of higher momentum are evident containing wind speeds that exceed those found upstream of the wind farm. These channels are believed to be a result of accelerated flow around an "obstacle" (e.g., the turbine) and can be seen as a continuous feature passing through multiple turbine rows. Appreciable lateral wake spreading appears to be evolving, as many individual wakes do not merge together at greater downwind distances. As individual wakes translate off-terrain, their structure becomes disrupted compared to those wakes located atop the flat terrain. It is believed that increased turbulent mixing associated with the decent of flow down the complex terrain feature enhances the modulation of these wakes. The inflow into Row 2 is also found to be greater than the inflow into Row 1 for a southwest inflow wind direction. A small town exists 1.8 km upstream of Row 1, creating a localized surface roughness increase, which may also act to modify the inflow wind profile into that row. It is also possible that Row 1 creates a "wall effect", forcing accelerated flow around it. This effect has been previously documented in a wind tunnel study as flow approaching the rectangular corner of a wind farm results in an acceleration around the farm [39].

Figure 9:
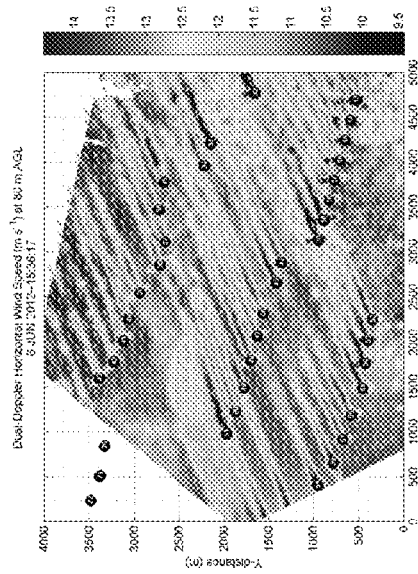
FIG. 9 shows terrain-adjusted DD horizontal wind speed (m s$^{-1}$) synthesis at hub height (80 m) from 1536 UTC on 6 Jun. 2012 in accordance with one embodiment of the present invention.
Figures 10A, 10B, 10C, 10D, 10E, 10F:
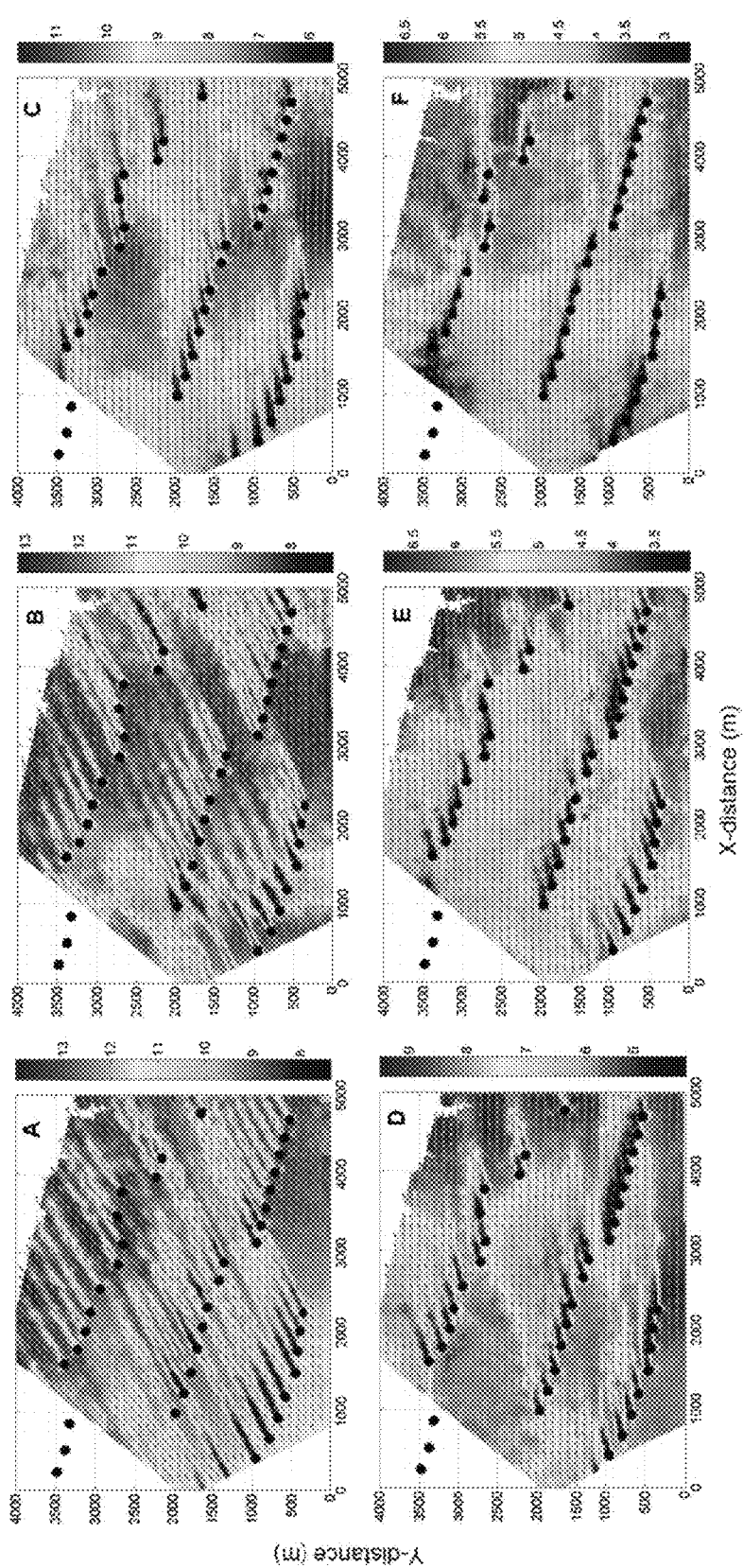
FIGS. 10A-10F show terrain-adjusted DD horizontal wind speed (m s$^{-1}$) synthesis at hub height (80 m) from (A) 1559 UTC (Volume 24), (B) 1616 UTC, (C) 1636 UTC, (D) 1654 UTC, (E) 1705 UTC, and (F) 1715 UTC on 6 Jun. 2012 in accordance with one embodiment of the present invention.

A complex and variable wind field is found within this turbine array during the 106 minute DD analysis period. FIG. 9 shows terrain-adjusted DD horizontal wind speed (m s-1) synthesis at hub height (80 m) from 1536 UTC on 6 Jun. 2012. FIGS. 10A-10F show terrain-adjusted DD horizontal wind speed (m s$^{-1}$) synthesis at hub height (80 m) from 1559 UTC (Volume 24) (FIG. 10A), 1616 UTC (FIG. 10B), 1636 UTC (FIG. 10C), 1654 UTC (FIG. 10D), 1705 UTC (FIG. 10E), and 1715 UTC (FIG. 10F) on 6 Jun. 2012. The black dots represent turbine locations and wind vectors are overlaid. The colorbar range is adjusted in each panel to emphasize wake structure. North is aligned with increasing Y-distance. The wake structure varies drastically as a function of wind direction and speed. Early in the analysis period, hub-height wind speeds are 12-13 m s$^{-1}$ and direction from the southwest, resulting in an individual wake structure and high momentum channels between wakes, as previously discussed (FIG. 10A). These high speed channels also appear more established for increased lateral turbine spacing. Periodically, a downstream turbine will experience a blend of a high speed channel and adjacent wake as its inflow, which may meaningfully impact turbine loading. Often transient gust and lull features pass through the domain, significantly altering the flow field within a portion of the wind farm. For example, a pronounced lull feature moves into the DD domain and interacts with Rows 1 and 3, disrupting the pre-existing wake structure (FIG. 10B). It takes just 12 minutes for this lull feature to translate west-to-east across the entire DD domain, impacting individual turbines for 1-2 minutes. As the local wind direction veers from southwest to west and becomes better aligned with the lateral axis of the turbine rows, individual wake structures merge and develop into a pronounced "conglomerate" wind speed deficit (FIGS. 10C-10D). When this happens, the high momentum channels between individual wakes vanish. Later in the analysis period, hub-height wind speeds drop to near 5-6 m s$^{-1}$, resulting in very short wake structures (FIGS. 10E-10F). The full analysis period highlights the complex flow variability that can exist on timescales spanning only minutes.

Figures 11A, 11B, 11C:
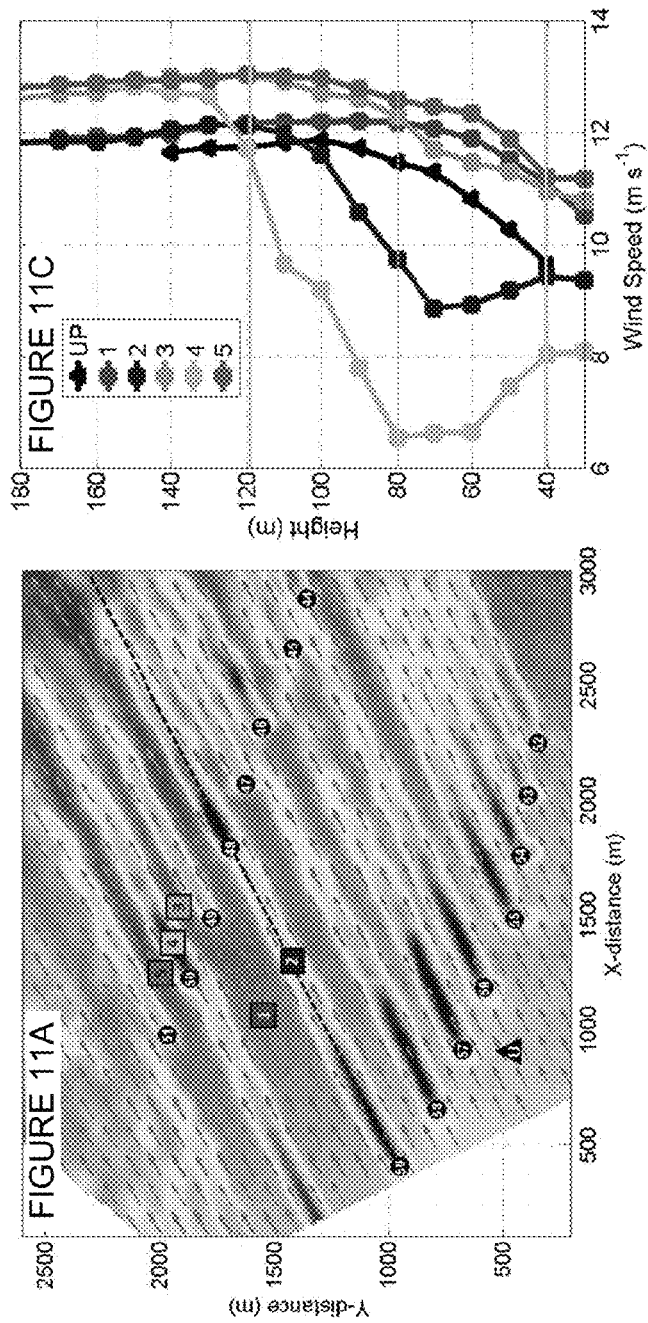
FIG. 11A shows the zoomed DD horizontal wind speed (m s$^{-1}$) at hub height (80 m) from a single volume at 1559 UTC (Volume 24) on 6 Jun. 2012 in accordance with one embodiment of the present invention.
FIG. 11B shows the vertical cross-section of horizontal wind speed (m s$^{-1}$) along the plane represented by the dashed black line in FIG. 11A in accordance with one embodiment of the present invention.
FIG. 11C shows the vertical profiles of horizontal wind speed for various locations within the wind field as denoted by the squares in FIG. 11A in accordance with one embodiment of the present invention.
Figures 15B, 15C, 15D, 15E, 15F, 15G:
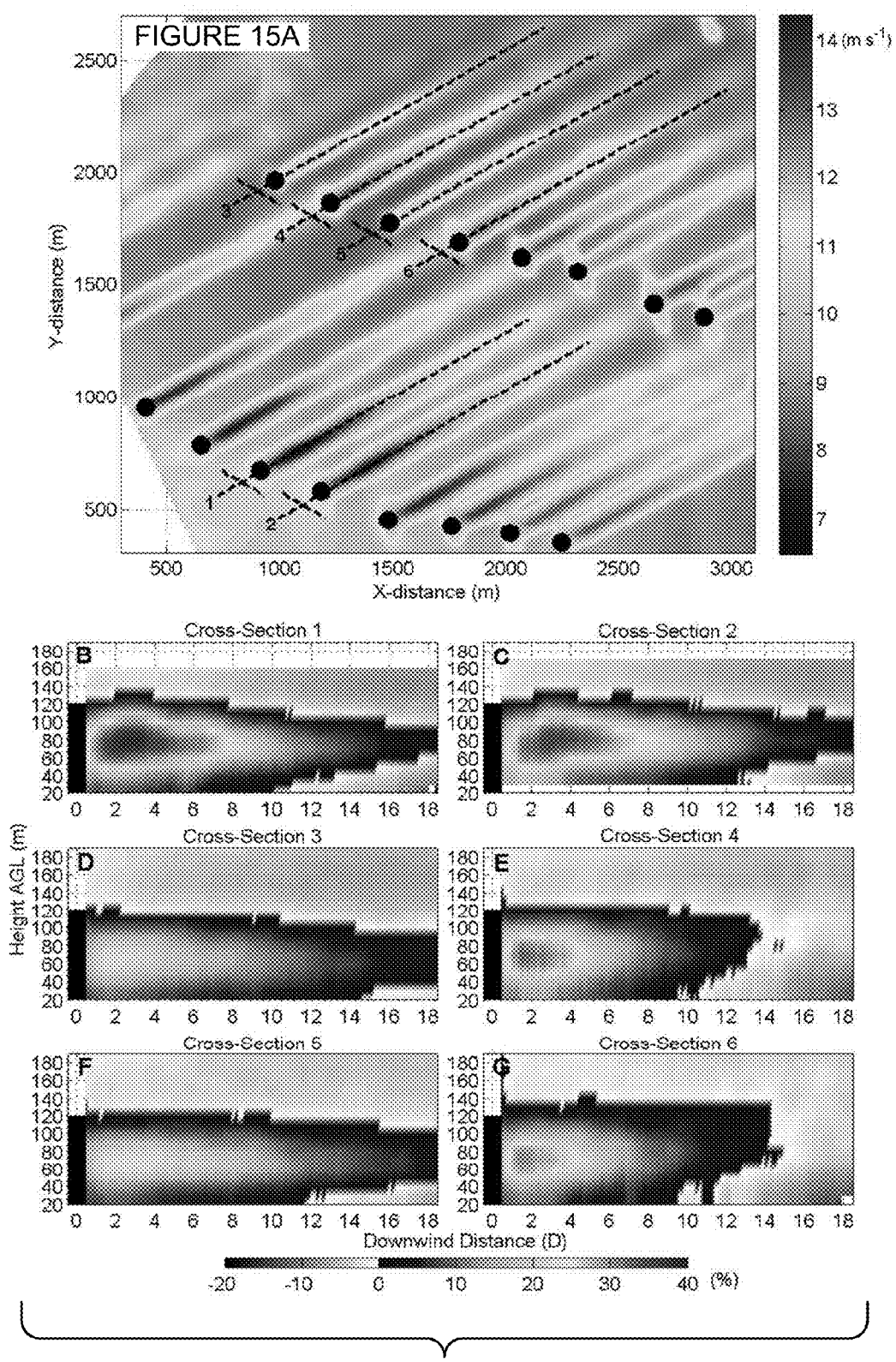
FIGS. 15B-15G show each of the six ten-minute composite vertical cross-sections, 1 (FIG. 15B), 2 (FIG. 15C), 3 (FIG. 15D), 4 (FIG. 15E), 5 (FIG. 15F), and 6 (FIG. 15G), represented as a wind speed percent difference from the wind profile 1 D upstream of each turbine in accordance with one embodiment of the present invention.

Vertical cross-sections and profiles can be constructed through portions of the DD domain to assess the vertical structure of individual wakes as well as turbine-to-turbine interaction. A wind speed vertical cross-section is constructed through a zoomed portion of the DD domain oriented roughly parallel to the mean wind direction and passing through two turbines. More specifically, FIG. 11A shows a zoomed DD horizontal wind speed (m s$^{-1}$) at hub height (80 m) from a single volume at 1559 UTC (Volume 24) on 6 Jun. 2012. The modulated flow within the wind farm, turbine wakes, local terrain effects, wind farm inflow, and the impact of enhanced surface roughness from a nearby town are all evident in this image. Turbine-to-turbine interaction is captured by this cross-section (indicated by the dashed black line in FIG. 11A) as the wake of Turbine 59 impacts the inflow of Turbine 48 as shown FIG. 11B. In FIG. 11B, horizontal wind speed is represented as a departure from an upstream vertical wind profile. In other words, wind speed deficits through this portion of the wake are shown. The cross-section passes through two turbines and shows a vertical representation of a portion of both wakes, including the flow above and below each wake. The black vertical rectangles represent the turbine locations along the cross-section to the top of the rotor sweep. The wake of Turbine 48 shows a slower wind speeds within its wake than that of Turbine 59. Turbines 47 and 49, located adjacent to Turbine 48 in the same row, produce considerably less wind speed reduction within their wakes than Turbine 48 at hub height. Their upstream flow is uncontaminated (FIG. 11A), resulting in a higher inflow wind speed, and therefore a reduced thrust coefficient. As shown in FIG. 11C, vertical wind speed profiles taken at various locations within the domain as denoted by the squares in FIG. 11A help to emphasize vertical wake structure, including the high wind speed channels between wakes. The grey horizontal lines represent the depth of the rotor sweep. The high wind speed channels represented by profiles 1 (red), 3 (green), and 5 (magenta) all contain a 1-2 m s$^{-1}$ higher wind speed through the depth of the rotor sweep than the wind speed profile taken upstream of the wind farm (black). Profiles 2 (blue) and 4 (cyan), taken within wakes, show minimum wind speeds centered near hub-height. Between hub height and the top of the rotor sweep, profile 4 contains a vertical speed shear of 5.2 m s$^{-1}$. At hub height the wind speed difference between profiles 4 and 5, horizontally separated by 150 m, is 6.0 m s$^{-1}$.

The presented image is one of over 150 volumes collected during this event. The wind speed magnitude and wind direction changed drastically throughout the data collection period. However, the radar deployment was never changed. The geometry of the deployment and size of the sectors scanned will dictate the size and shape of the usable dual-Doppler domain. From one deployment to the next, this deployment geometry can and will vary depending, for example, on the number/orientation of turbines, how much overall spatial coverage is desired, and how quickly volume completion is desired. The closer the radars are together or smaller the sector scanned, the smaller the available dual-Doppler domain and visa-versa. The smaller the sector and/or less elevation tilts used, the faster the volume, etc. There are a wide variety of ways a deployment can be set up depending on the desired dataset.

In the absence of turbines, the same type of deployment as shown here could be used to simply map the wind field over a large spatial area, and be advantageous for providing enhanced resource assessment and accessing the impact of local terrain. The results can also be used for anticipatory control if an abrupt change in wind speed/direction was approaching a wind farm. One main advantage of these dual-Doppler analyses employing radar data is that a continuous horizontal and/or vertical wind field can be mapped over a relatively large spatial area. Current operational turbines are only capable of "seeing" the wind features that are already passing through them. They have no awareness of what is going on around them.

Similarly, FIG. 12A shows the zoomed DD horizontal wind speed (m s$^{-1}$) at hub height (80 m) from a single volume at 1559 UTC (Volume 24) on 6 Jun. 2012 in accordance with one embodiment of the present invention. Turbine-to-turbine interaction is captured by this cross-section (indicated by the dashed magenta line in FIG. 12A) as the wake of Turbine 58 impacts the inflow of Turbine 47 and the wake of Turbine 47 impacts the inflow of Turbine 35 as shown FIG. 12B. A cross-section of the wakes behind Turbines 13-20 and 44-51 (indicated by the dashed gray line in FIG. 12A) are shown in FIG. 12C. FIG. 12D shows the vertical profiles of horizontal wind speed for various locations within the wind field as denoted by the squares in FIG. 12A.

Likewise, FIG. 13A shows the zoomed DD horizontal wind speed (m s$^{-1}$) at hub height (80 m) from a single volume at 1602 UTC (Volume 27) on 6 Jun. 2012 in accordance with one embodiment of the present invention. Turbine-to-turbine interaction is captured by this cross-section (indicated by the dashed magenta line in FIG. 13A) as the wake of Turbine 58 impacts the inflow of Turbine 47 and the wake of Turbine 47 impacts the inflow of Turbine 35 as shown FIG. 13B. FIG. 13C shows the elevation along the cross-section (indicated by the dashed magenta line in FIG. 13A). FIG. 13D shows the vertical profiles of horizontal wind speed for various locations within the wind field as denoted by the squares in FIG. 13A.

FIG. 14A shows a composite zoomed DD horizontal wind speed (m s$^{-1}$) at hub height (80 m) from multiple volumes between 1559-1609 UTC (Volumes 24-34) on 6 Jun. 2012 in accordance with one embodiment of the present invention. Turbine-to-turbine interaction is captured by this cross-section (indicated by the dashed magenta line in FIG. 14A) as the wake of Turbine 58 impacts the inflow of Turbine 47 and the wake of Turbine 47 impacts the inflow of Turbine 35 as shown FIG. 14B. FIG. 14C shows the elevation along the cross-section (indicated by the dashed magenta line in FIG. 14A). FIG. 14D shows the vertical profiles of horizontal wind speed for various locations within the wind field as denoted by the squares in FIG. 14A.

Figure 16:
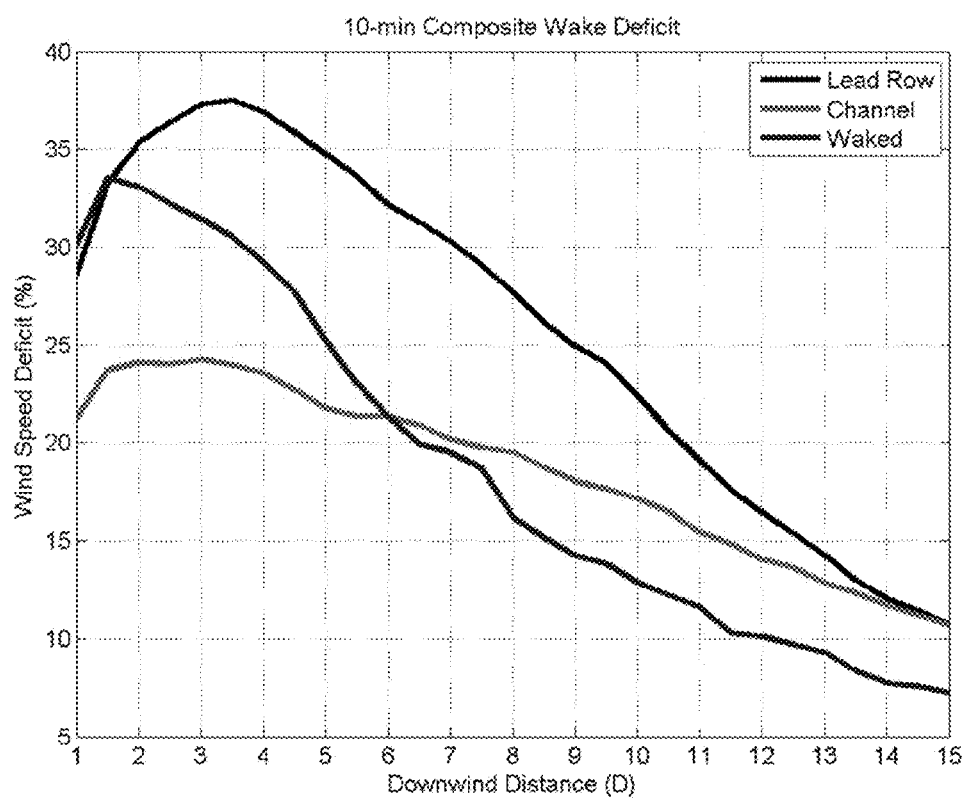
FIG. 16 is a graph showing the wind speed deficit (%) for the ten-minute composite DD wind speed at hub height (80 m) from 1559-1609 UTC (Volumes 24-34) on 6 Jun. 2012 in accordance with one embodiment of the present invention.
Figure 17:
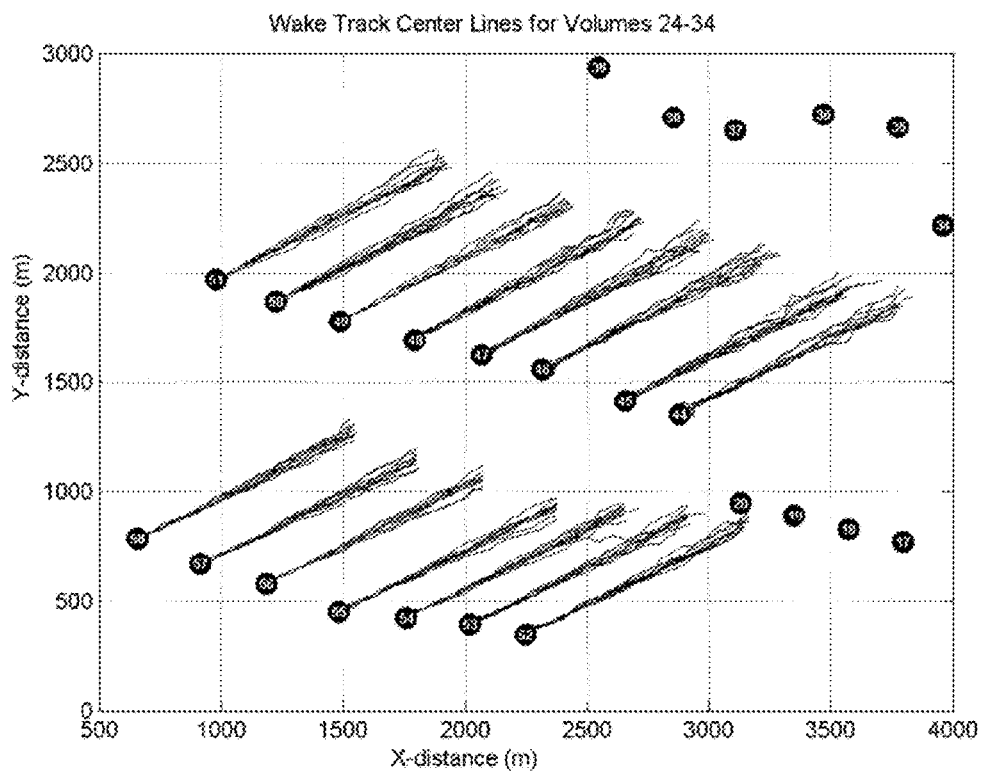
FIG. 17 is a graph assessing the wake width vs. wake meandering for the ten-minute composite DD wind speed at hub height (80 m) from 1559-1609 UTC (Volumes 24-34) on 6 Jun. 2012 in accordance with one embodiment of the present invention.

Now referring to FIGS. 15A-15G, the DD analysis domain horizontal wind speed at hub height (80 m) is composited between 1559-1609 UTC (Volumes 24-34) to construct 10-minute mean vertical cross-sections describing the wake structure for a series of neighboring turbines. This particular period is chosen because individual wakes are relatively straight and have limited interaction with wakes surrounding them. For all cross-sections, wind speed is represented as a percent difference from the 10-minute average wind speed profile 1 D upwind of each respective turbine. Cross-sections 1 (FIG. 15B) and 2 (FIG. 15C) represent the wakes of turbines in Row 1 of the wind farm experiencing an undisturbed inflow (Lead Row). Cross-sections 3 (FIG. 15D) and 5 (FIG. 15F) represent the wakes of turbines located in Row 3 experiencing high momentum channels as their mean inflow (Channel). Cross-sections 4 (FIG. 15E) and 6 (FIG. 15G) represent the wakes of turbines located in Row 3 whose mean inflow is the wake of upstream turbines (Waked). As shown in FIG. 16, the wake deficits are greatest within cross-sections 1 and 2 (Lead Row), exceeding 35% 2-4 D downstream of each turbine. Maximum wake deficits for cross-sections 3 and 5 (Channel), however, remain below 25%. It is believed that the higher inflow wind speed for these turbines results in a reduced thrust coefficient, and therefore smaller wake deficits. The wakes in cross-sections 4 and 6 (Waked) appear shorter than those in the other cross-sections. Because the inflow for these turbines is comprised of wake from upstream turbines, it is believed that added turbulence helps to more effectively reduce these wake deficits as these wakes translate farther downstream. For all composite cross-sections, the wakes do not exhibit vertical growth with downstream distance. In all cases, the wake height remains very closely tied to the height of the top of the rotor sweep. A graph assessing the wake width vs. wake meandering is shown in FIG. 17.

Operational turbine data were made available by the wind farm operator allowing for comparison of and integration into the DD wind fields. For this study, nacelle wind speed, yaw position, and power output were provided at 1 Hz temporal resolution. Nacelle wind speed was collected by a three-cup anemometer, and a transfer function has been applied to account for the influence of the turbine blades. These data were averaged every 60 s, centered on each DD volume interval.

Features in the DD wind field can be directly related to individual turbine power output. FIGS. 18A-18B provide a comparison of two snapshot DD wind fields and FIG. 18C shows the power output time history for four specific turbines (47, 48, 49 and 57) over the full analysis period. At 1559 UTC (Volume 24), the DD hub height wind field shows Turbines 47 (red) and 49 (blue) within high momentum wind speed channels while Turbine 48 (green) is waked (FIG. 18A). Turbine 57 (black) represents a turbine in Row 1 that is experiencing a lower hub-height inflow wind speed than Turbines 47 and 49 in Row 3. It would be expected that Turbines 47 and 49 both output more power than Turbine 57, and considerably more power than turbine 48. The turbine power output data validates the DD wind field as Turbines 47 and 49 output roughly 8% (15%) more power than Turbine 57 (48).

Several minutes later, a transient wind speed lull enters the wind farm, first impacting Turbine 57 in Row 1 (FIG. 18B). Power output for Turbine 57 decreases 28% over the five-minute period between 1611-1616 UTC (Volumes 37-42) as the feature passes by, before fully recovering the 28% the following minute at 1617 UTC (Volume 43). The impact of this lull can be seen in the time histories of the other three turbines within the next few minutes. These analyses show that the power output of an individual turbine can change meaningfully within minutes. These analyses also highlight the significant role that higher wind speed channels can play, as power output is increased for turbines behind the lead turbine row that are positioned within them. The scales of motion important for turbine power production are captured using the employed radar scanning strategy and resultant DD-generated wind fields. When assessing wake structure and wake impact on power output within a wind farm using 10-minute SCADA data, the presented radar wind fields suggest that wake structure, evolution, and meaningful power output variability are not adequately described when using a 10-minute averaging period.

For turbines where DD data exists through the depth of the rotor sweep (29 turbines), the local DD wind field upstream of each turbine is compared to the nacelle wind speed for all 109 DD volumes (3161 independent comparisons). At the location of each turbine, a local wind direction is determined for every volume. A vertical cross-section slab is constructed 1 D upwind of each turbine, centered on each turbine and aligned with the determined turbine wind direction. The vertical cross-section encompasses the entire rotor sweep, which includes 45 analysis gridpoints. From each cross-section, a 1 D upwind point wind speed is extracted at the cross-section coordinates x=0 m, y=80 m, centered on the turbine nacelle and representing a hub height point measure. A second wind speed estimate is also made by averaging the 45 wind speed gridpoint values contained within the rotor sweep slab. For example, FIG. 19A shows the zoomed domain of DD horizontal wind speed (m s$^{-1}$) from 1554 UTC (Volume 20) at hub-height (80 m) with reference line (solid black) to the vertical cross-section 1 D upwind of Turbine 56, and FIG. 19B shows the wind speed vertical cross-section 1 D upwind of Turbine 56 showing the rotor sweep and DD analysis domain gridpoints. The nacelle and 1 D upwind DD wind speed and direction comparison summary statistics are also shown. The 1 D upwind hub height point and rotor sweep mean wind speeds for Turbine 56 at 1554 UTC (Volume 20) is 11.0 m s$^{-1}$ and 10.8 m s$^{-1}$, respectively. The nacelle wind speed measured for Turbine 56, Volume 20, is 10.9 m s$^{-1}$. The rotor vertical shear is 1.4 m s$^{-1}$ and the rotor horizontal shear is −0.0 m s$^{-1}$. The turbine yaw is 241.3°. The DD hub-height point WD is 240.9° and the DD rotor sweep mean WD is 241.4°.

Figure 20B:
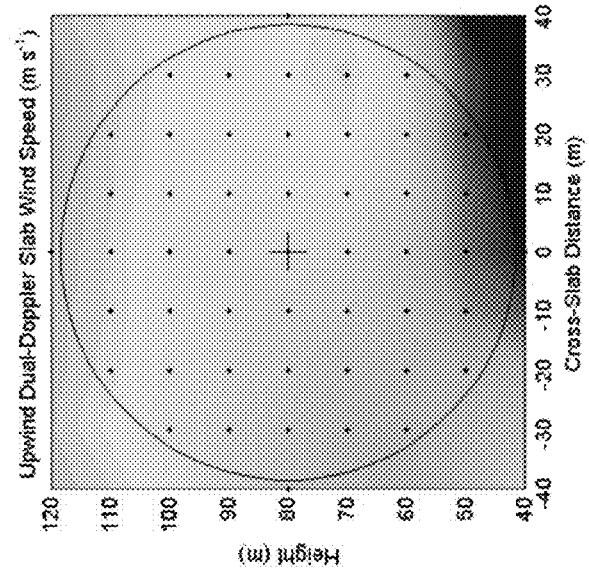
FIG. 20B shows the wind speed vertical cross-section 1 D upwind of Turbine 36 showing the rotor sweep and DD analysis domain gridpoints in accordance with one embodiment of the present invention.
Figure 20A:
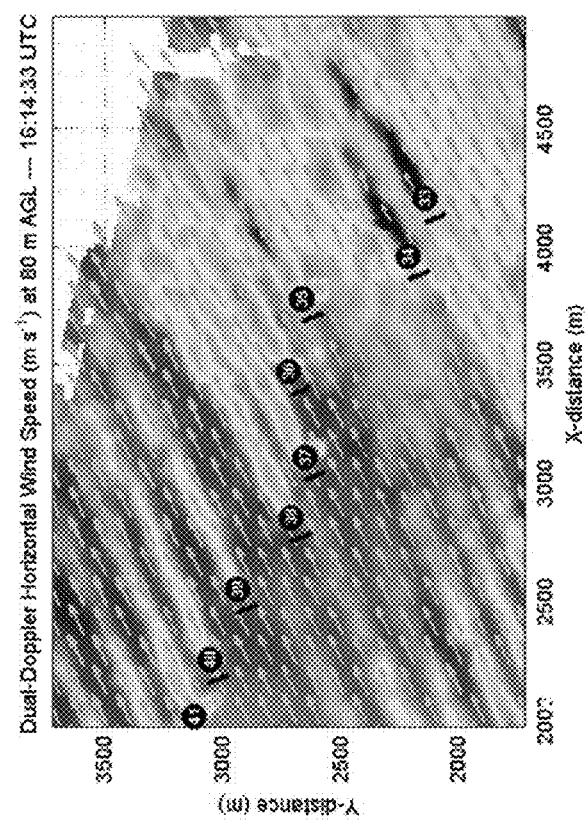
FIG. 20A shows the zoomed domain of DD horizontal wind speed (m s$^{-1}$) from 1615 UTC (Volume 40) at hub-height (80 m) with reference line (solid black) to the vertical cross-section 1 D upwind of Turbine 36 in accordance with one embodiment of the present invention.
Figure 20C:
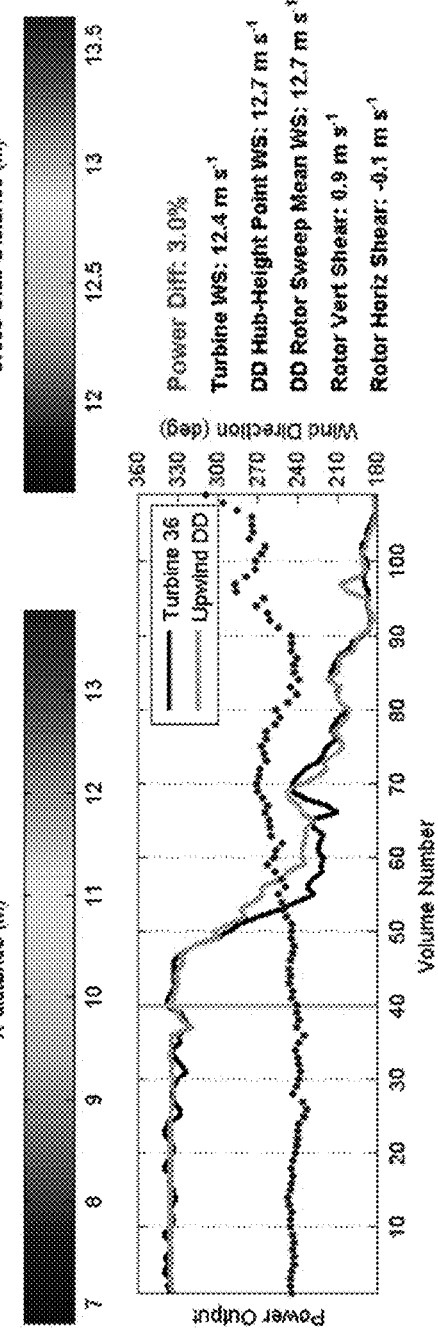
FIG. 20C shows the power output for Turbine 36 and the DD upwind power output in accordance with one embodiment of the present invention.

Similarly, FIG. 20A shows the zoomed domain of DD horizontal wind speed (m s$^{-1}$) from 1615 UTC (Volume 40) at hub-height (80 m) with reference line (solid black) to the vertical cross-section 1 D upwind of Turbine 36 in accordance with one embodiment of the present invention. FIG. 20B shows the wind speed vertical cross-section 1 D upwind of Turbine 36 showing the rotor sweep and DD analysis domain gridpoints. FIG. 20C shows the power output for Turbine 36 and the DD upwind power output. The 1 D upwind hub height point and rotor sweep mean wind speeds for Turbine 36 at 1615 UTC (Volume 20) is 12.7 m s$^{-1}$ and 12.7 m s$^{-1}$, respectively. The nacelle wind speed measured for Turbine 36, Volume 40, is 12.4 m s$^{-1}$. The rotor vertical shear is 0.9 m s$^{-1}$ and the rotor horizontal shear is −0.1 m s$^{-1}$.

FIGS. 21A-21B are scatter plots of DD upwind hub height wind speed (m s$^{-1}$) (FIG. 21A) and DD rotor sweep mean wind speed (m s$^{-1}$) versus nacelle wind speed (m s$^{-1}$) (FIG. 21B). A linear regression analysis of the collection of DD upwind hub height point and rotor sweep mean wind speeds versus 60 s mean turbine nacelle wind speeds for all 3161 comparison points yields coefficient of determination ($r^2$) values of 0.970 and 0.966, respectively. For wind speeds less than 6 m s$^{-1}$, the DD hub height point wind speeds exceed the turbine nacelle wind speed by an average of 0.52 m s$^{-1}$. Between 6-11 m s$^{-1}$, the turbine nacelle wind speed exceeds the DD hub height wind speed by an average of 0.14 m s$^{-1}$. Above 11 m s$^{-1}$, the DD hub height wind speed exceeds the nacelle wind speed by an average of 0.31 m s$^{-1}$. These small differences may be in part due to inadequacies in the transfer function applied, particularly at lower wind speeds.

Figure 22:
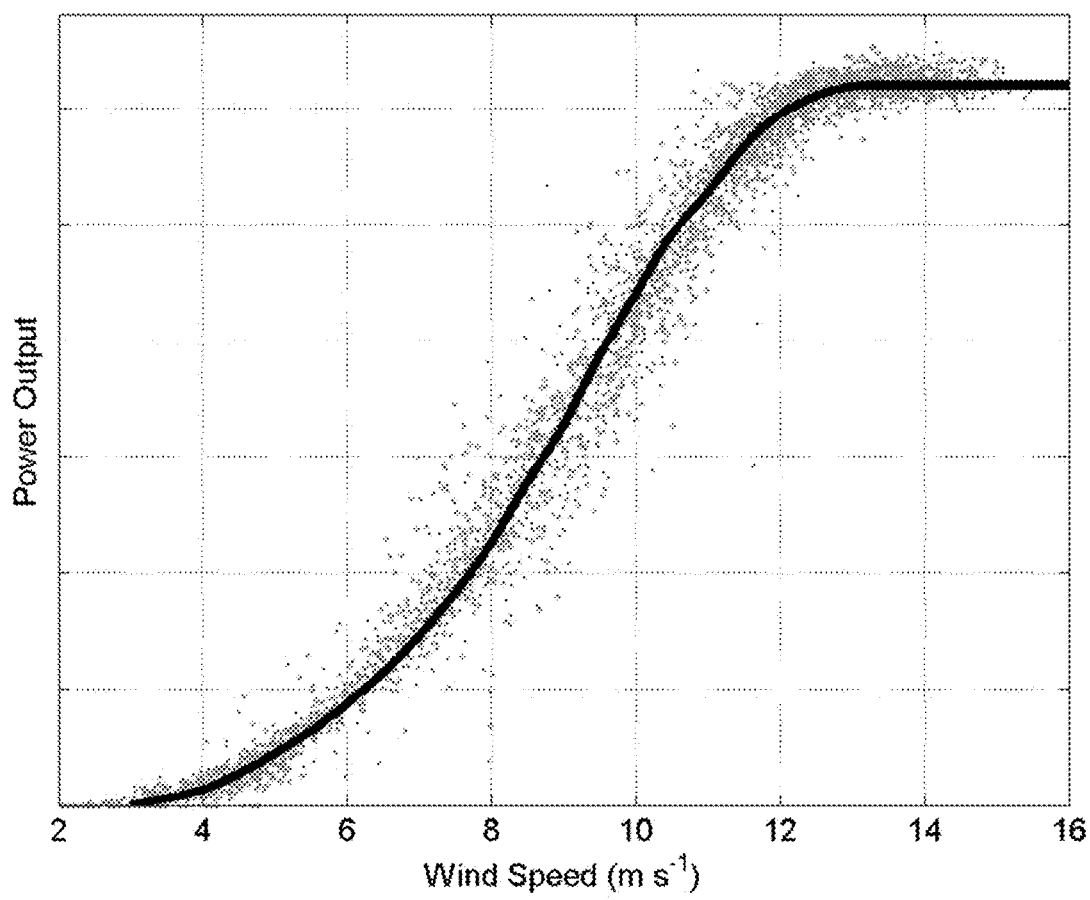
FIG. 22 is a scatter plot of the DD upwind hub height wind speed (m s$^{-1}$) from 29 turbines and 109 volumes (3161 points) with power curve fit overlayed as the solid black line in accordance with one embodiment of the present invention.

Because the DD upwind wind speeds compare well to the actual nacelle wind speeds, the DD upwind wind speeds are used to project power output for each turbine. To accomplish this, a representative power curve is constructed using the same 3161 hub height comparison points. This power curve construction is possible because the range of hub-height wind speeds (as measured by the turbine nacelle) through the full data collection period is 2.0-15.5 m s$^1$, providing for a wide range of wind speeds to consider. The DD upwind hub height point wind speed is plotted versus the actual turbine output, and a resultant power curve is fit to these data (FIG. 22). Using the constructed power curve, each DD upwind hub height wind speed is then converted to a power output value. It is noted that the wind speed values used to construct this power curve are representative of the inflow of a given turbine at any point in time, and could represent undisturbed inflow, wake, a high-speed channel, or some combination of different effects. Despite this diverse collection of values, when conducting a linear regression analysis of the DD derived power output versus actual turbine power output, the resulting $r^2$ value is 0.987 (FIG. 23A). DD derived power output time histories for individual turbines are then constructed (FIG. 23B). For Turbine 45, the difference between the DD derived power output and the actual turbine power output over the 109 volumes is 0.9%. Remarkably, the composite power output difference for all 3161 comparison points (29 turbines, 109 volumes) is 0.01%. The DD wind fields do an exceptional job of projecting the composite power output across the portion of the wind farm examined.

In isolated instances, the DD derived power output can differ substantially from the actual turbine power output. An example is provided in FIGS. 24A-24C as the inflow for Turbine 36 consists of the merged wakes of Turbines 37 and 38. For the snapshot shown at 1647 UTC (Volume 73 denoted by the dashed vertical line), the DD rotor sweep 1D upwind of Turbine 36 contains a non-standard wind profile. It is therefore expected that the DD power output projection will deviate from the actual turbine power output. Here, the DD derived power output under predicts the actual power output by 32.3%. However, this large difference only lasts a couple of minutes, while the remainder of the time history compares quite well.

Using various analysis techniques, wake structure is found to be modulated by transient gust/lull features and complex terrain. Channels of higher momentum are found between individual wakes when the wind direction is oriented perpendicular to a row of turbines. These channels represent a wind speed excess through the depth of the rotor sweep from what is found upstream of the wind farm. The radar-derived wind fields are coupled with operational turbine data to examine and project turbine power output. Turbines located within these channels output more power than those turbines found in the leading turbine row. An acceleration of flow around the leading turbine row is also documented for a similar wind direction. Additionally, individual wakes are found to combine in an aggregate wind speed deficit when the wind direction becomes oriented increasingly parallel to a row of turbines. When ten-minute composite turbine wake deficits are compared to the turbine inflow, they vary considerably based on the inflow wind speed, and reach 40% 2-4 D downwind. The wake length downwind of turbines that experience upstream wake as their inflow appear shorter than those whose inflow is comprised of undisturbed flow.

Measurements such as those provided herein can be incorporated into wake modeling efforts to improve expected power output projections for a given wind farm and improve turbine layout methods. Individual turbine wakes may be assessed and compared, including mean structure and variability with downwind distance. Additionally, rapidly updated wind field maps can be employed by wind farm and individual turbine control systems to enhance performance and proactively respond to incoming wind features.

In the absence of turbines, these same data collection and analyses methodologies can be used to aid resource assessment and to improve the understanding of local terrain effects. When coupling Doppler radar wind measurements with available turbine power performance data, complex flows can be related to the expected power output deficits for multiple turbines located within various portions of a wind farm.

Figure 25:
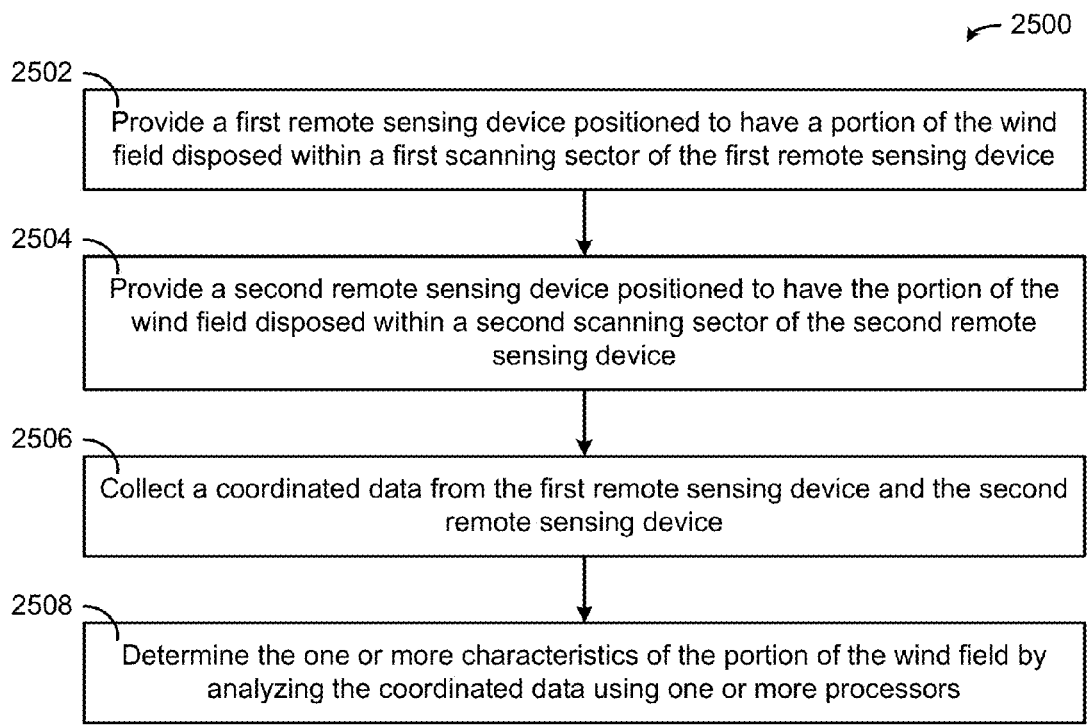
FIG. 25 is a flow chart of a method for obtaining data to determine one or more characteristics of a wake of one or more turbines in accordance with one embodiment of the present invention.

Referring now to FIG. 25, a flow chart for a method 2500 for obtaining data to determine one or more characteristics of a wind field in accordance with the present invention is shown. A first remote sensing device is positioned to have a portion of the wind field (e.g., one or more locations of interest) disposed within a first scanning sector (as referred to as a "look angle") of the first remote sensing device in block 2502. A second remote sensing device is positioned to have the portion of the wind field disposed within a second scanning sector of the second remote sensing device in block 2504. A coordinated data is collected from the first remote sensing device and the second remote sensing device in block 2506. One or more characteristics of the portion of the wind field are determined by analyzing the coordinated data using one or more processors in block 2508. The one or more characteristics may include the mean and variable structure of the portion of the wind field, locating and tracking enhanced turbulence within the portion of the wind field, a plurality of center points for one or more turbine wake(s), a length of the one or more turbine wake(s), a set of horizontal wind speed deficits within the portion of the wind field relative to a free-stream flow, a power output reduction for one or more turbines within the portion of the wind field, recognition of a localized event of interest (e.g., thunderstorm outflow) which may contain significant changes in wind speed and/or direction, documentation of the vertical profile of wind speed and direction within the wind field, or a combination thereof.

The first remote sensing device and the second remote sensing device can be a radar, a Doppler radar or other type of detection technology (e.g., LIDAR) or other technologies developed in the future. Moreover, the first remote sensing device and the second remote sensing device can be mobile or fixed. Note that fixed remote sensing devices will typically be installed at a height approximately equal to or near hub height of the wind turbines within and adjacent to the portion of the wind field of interest. The remote sensing devices can also have multiple nodes. Multiple tilt angles can be used to determine what is happening vertically above the hub of the wind turbines, which previously could not be done. The remote sensing devices can be set for continuous scanning, "on-demand" scanning, scanning at predefined time periods, scanning upon occurrence of a trigger event, or other desired operational mode.

Typically, the first scanning sector of the first remote sensing device is offset from the second scanning sector of the second remote sensing device by an angle of at least 20 to 30 degrees. However, the scanning range of the present invention is not limited to any sector. For example, the scanning sector can be a full 360 degrees and not limited. Furthermore, one or more additional remote sensing devices can be positioned to have the portion of the wind field or another portion of the wind field within an additional scanning sector for the additional remote sensing devices. For example, multiple remote sensing devices can be positioned such that they have scanning sectors that progressively overlap one another (i.e., "leap frog" one another). In other words, a second scanning sector overlaps a portion of first scanning sector, a third scanning overlaps a portion of the second scanning sector and may or may not include a portion of the first scanning sector, a fourth scanning sector overlaps a portion of the third scanning sector and may or may not include a portion of the first or second scanning sectors, and so on. The only limitation on the size of the portion of the wind field is that the return signals have to be coherent enough to obtain the dual-sensor synthesized data. Note also that the remote sensing devices can be positioned upstream or downstream or both from the portion of the wind field being analyzed.

The step of collecting the coordinated data from the first remote sensing device and the second remote sensing device may include the steps of collecting a raw data from the first remote sensing device and the second remote sensing device, and processing the raw data to generate the coordinated data. The step of processing the raw data comprises the steps of converting the raw data to a data exchange format, interpolating the converted data from a native polar coordinate space to a Cartesian grid, and generating the coordinated data by generating a U horizontal wind velocity component and a V horizontal wind velocity component for each grid point within the Cartesian grid. The coordinated data may include synthesized horizontal wind flows describing the wake of the one or more turbines and a free-stream flow surrounding the wake.

Additional steps may include compositing the data using a wake-relative orientation to assess an ensemble averaged wake structure as a deficit from a free-stream flow field or developing a mean free-stream wind profile by averaging a section of the coordinated data not impacted by a wake of one or more turbines. Other steps may include accessing variability about the mean, developing a plurality of vertical cross-sections through a wake of one or more turbines at various distances downwind from the one or more turbines, compositing the vertical cross-sections at each distance downwind from the one or more turbines, and presenting each composited vertical cross-section as a percent reduction/deficit from a derived free-stream wind profile. A mean and maximum wind speed deficit may also be assessed for each downwind composite cross-section.

Figure 26:
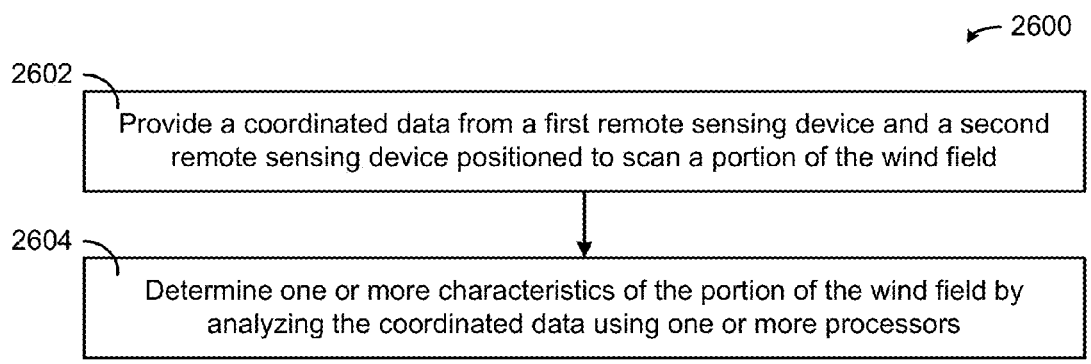
FIG. 26 is a flow chart for a method for determining one or more characteristics of a wake of one or more turbines in accordance with the present invention.

Now referring to FIG. 26, a flow chart for a method 2600 for determining one or more characteristics of a wake of one or more turbines in accordance with the present invention is shown. A coordinated data is provided from a first remote sensing device and a second remote sensing device positioned to scan a portion of the wind field in block 2602. The one or more characteristics of the portion of the wind field are determined by analyzing the coordinated data using one or more processors in block 2604.

Figure 27:
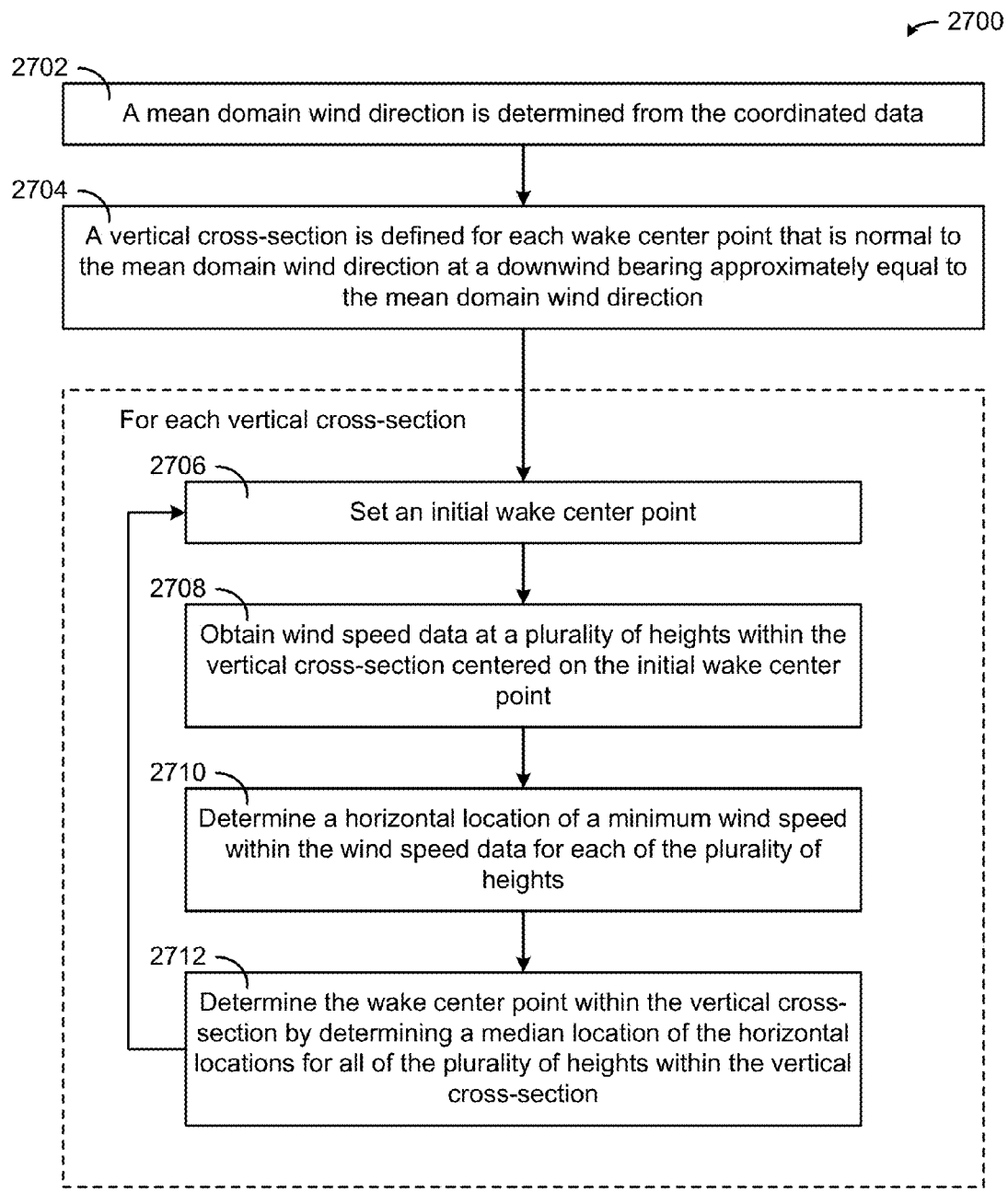
FIG. 27 is a flow chart for a method for determining a plurality of wake center points of the one or more turbines in accordance with the present invention.

Referring now to FIG. 27, a flow chart for a method 2700 for determining a plurality of wake center points of the one or more turbines is shown. A mean domain wind direction is determined from the coordinated data in block 2702. A vertical cross-section is defined for each wake center point that is normal to the mean domain wind direction at a downwind bearing approximately equal to the mean domain wind direction in block 2704. For each vertical cross-section, an initial wake center point is set in block 2706, wind speed data is obtained at a plurality of heights within the vertical cross-section centered at the initial wake center point in block 2708, a horizontal location of a minimum wind speed is determined within the wind speed data for each of the plurality of heights in block 2710, and the wake center point is determined within the vertical cross-section by determining a median location of the horizontal locations for all of the plurality of heights within the vertical cross-section in block 2712. If the wake center point is a first wake center point, the initial wake center point comprises a X location approximately downwind from the one or more turbines, and a Y location approximately equal to a center height of the one or more turbines. If, on the other hand, the wake center point is a subsequent wake center point, the initial wake center point comprises the X location approximately downwind from the one or more turbines, and the Y location approximately equal to the Y location of a previous wake center point. A minimum height and a maximum height of the plurality of heights may correspond to an approximate depth of a rotor sweep of the one or more turbines. A width of each vertical cross-section can be selected between 125% and 175% of an approximate depth of a rotor sweep of the one or more turbines. Other depths can be used.

Figure 28:
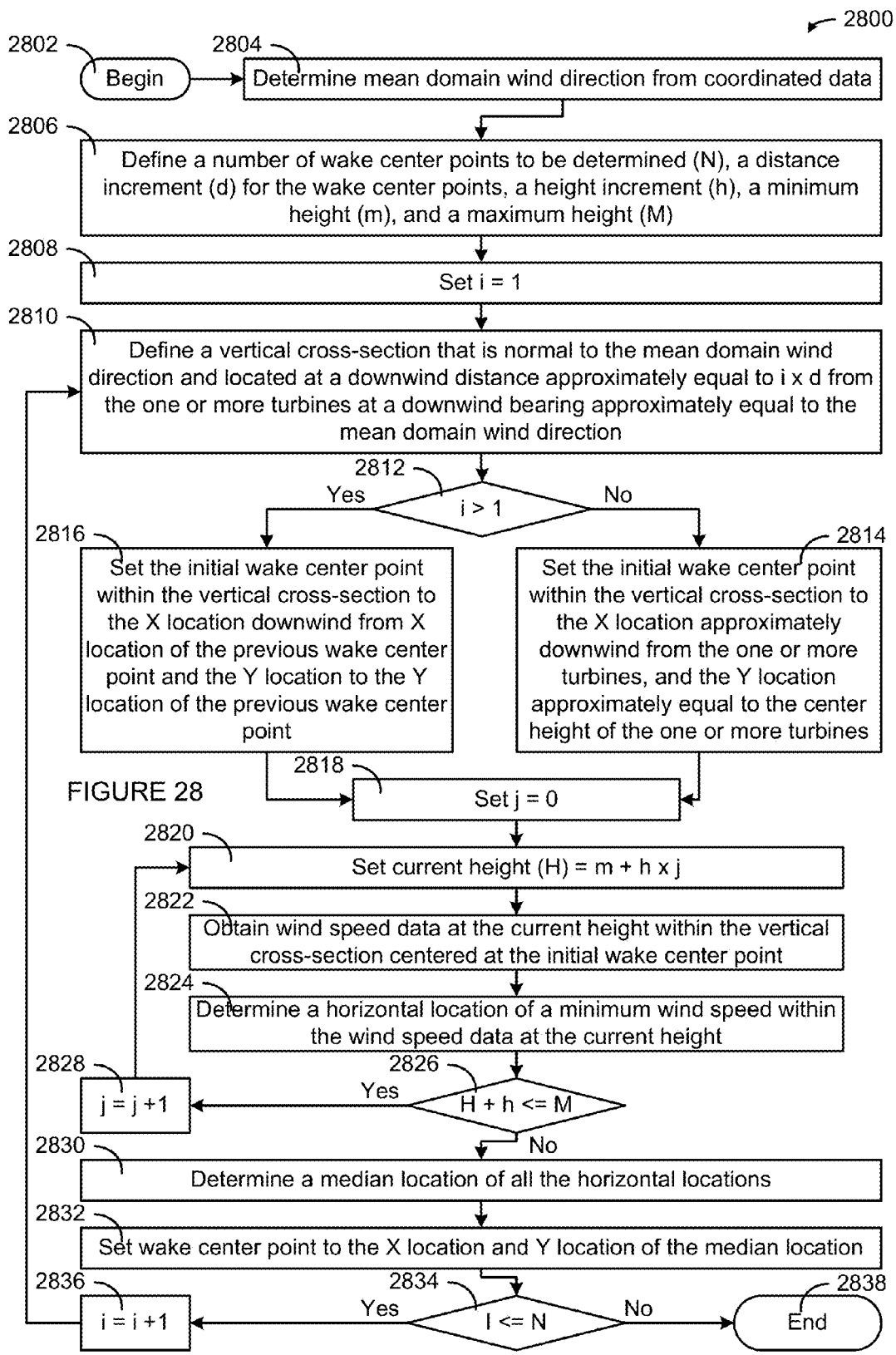
FIG. 28 is a flow chart for a method for determining a number of wake center points for one or more turbines in accordance with the present invention.

Now referring to FIG. 28, a flow chart for a method 2800 for determining a number of wake center points for one or more turbines in accordance with the present invention. The process begins in block 2802 and a mean domain wind direction is determined from the coordinated data in block 2804. The following parameters are defined in block 2806: a number of wake center points to be determined (N), a distance increment (d) for the wake center points, a height increment (h), a minimum height (m), and a maximum height (M). In block 2808, i is set equal to 1. A vertical cross-section is defined in block 2810 that is normal to the mean domain wind direction and located at a downwind distance approximately equal to i×d from the one or more turbines at a downwind bearing approximately equal to the mean domain wind direction. If i is not greater than 1, as determined in decision block 2812, the initial wake center point within the vertical cross-section is set in block 2814 to the X location approximately downwind from the one or more turbines, and the Y location approximately equal to the center height of the one or more turbines. If, however, i is greater than 1, as determined in decision block 2812, the initial wake center point within the vertical cross-section is set in block 2816 to the X location downwind from the X location of the previous wake center point, and the Y location to the Y location of the previous wake center point. After the initial wake center points have been set in blocks 2814 or 2816, j is set to 0 in block 2818 and the current height (H) is set to m+h×j in block 2820. In block 2822, the wind speed data is obtained at the current height within the vertical cross-section centered at the initial wake center point. If H+h is less than or equal to M, as determined in decision block 2826, j is set to j+1 in block 2828 and the process returns to block 2820 and repeats the process as previously described. If, however, H+h is not less than or equal to M, as determined in decision block 2826, a median location of all the horizontal locations is determined in block 2830 and the wake center point is set to the X location and the Y location of the median location in block 2832. If i is less than or equal to N, as determined in decision block 2834, i is set to I+1 in block 2836 and the process returns to block 2810 and repeats the process as previously described. If, however, i is not less than or equal to N, as determined in decision block 2834, the process ends in block 2838.

Note that the conversion of the remote sensing device data through different data translations and the subsequent processes described herein will vary depending on the equipment being used and the objective of the project. As a result, the present invention is not limited to the specific conversion, calculation and processing methods described herein. Custom applications may be coded to allow for enhanced performance.

The present invention provides comprehensive information about the modulated flows within a wind field or farm. These technologies and techniques will enhance wind farm design, layout practices and operation. Documenting the structure and evolution of complex flows within and surrounding wind farms will lead to increased efficiency as turbine wakes are fully characterized, turbine-to-turbine interactions are defined, transient wind events are proactively identified, the effects of local terrain are documented, and turbine inflows are adequately characterized allowing intelligent control of individual wind turbines and entire wind farms.

Utilizing adaptive scanning strategies, the variability of the flow surrounding a turbine can be documented in real time. Individual turbine wakes can be tracked at multiple downstream locations both in the horizontal and vertical dimensions. Inflow-relative wind speed reductions can be constructed across the rotor sweep, along with power output deficits for a hypothetical downstream turbine located within the wake. These same principles also can be expanded to multiple turbines in a wind farm setting where turbine-to-turbine interactions exist.

Integration of these technologies and techniques will lead to "smarter" wind farms by improving individual turbine and wind farm awareness and efficiency. The deployment of multiple remote sensing devices can document the modulated wind field of an entire wind farm, leading to an advanced controls opportunity to optimize the wind farm for enhanced performance and loads mitigation, reducing the cost of energy. Moreover the data derived from such measurements can be used to model wind farms and provide optimized wind turbine layouts for new turbines or new wind farms.

In summary, the implementation of pulse compression capabilities and innovative deployment and analyses techniques make advanced Doppler radar technologies well equipped to explore complex flows relevant to wind energy, including control volumes containing a significant number of turbines. Innovative Doppler radar technologies can be applied to advance several wind energy sectors:

Improve existing wake modeling efforts and layout practices.

Provide situational awareness for input into "smart" wind farm control systems.

Generate detailed wind maps for resource assessment (e.g. complex terrain, coastal transition, offshore, etc.).

Assess individual turbine performance and identify turbine maintenance needs.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

REFERENCES

1. R. J. Barthelmie, S. T. Frandsen, M. N. Nielsen, S. C. Pryor, P. E. Rethore, and H. E. Jørgensen, 2007: Modelling and measurements of power losses and turbulence intensity in wind turbine wakes at Middelgrunden offshore wind farm. *Wind Energy*, 10, 517-528.
2. R. J. Barthelmie, and Coauthors, 2009: Modelling and measuring flow and wind turbine wakes in large wind farms offshore. *Wind Energy*, 12, 431-444.
3. R. J. Barthelmie, and Coauthors, 2010: Quantifying the impact of wind turbine wakes on power output at offshore wind farms. *J. Atmos. Oceanic Technol.*, 27, 1302-1317.
4. R. J. Barthelmie, and L. E. Jensen, 2010: Evaluation of wind farm efficiency and wind turbine wakes at the Nysted offshore wind farm. *Wind Energy*, 13, 573-586.
5. A. Crespo, J. Hernandez, and S. Frandsen, 1999: Survey of modeling methods for wind turbine wakes and wind farms. *Wind Energy*, 2, 1-24.
6. N. J. Vermeer, J. N. Sørensen, and A. Crespo, 2003: Wind turbine wake aerodynamics. *Prog. Aerosp. Sci.*, 39, 467-510.
7. N. Troldborg, G. C. Larsen, H. A. Madsen, K. S. Hansen, J. N. Sørensen, and R. Mikkelsen, 2011: Numerical simulations of wake interaction between two wind turbines at various inflow conditions. *Wind Energy*, 14, 859-876
8. J. S. Gonzalez A. G. G. Rodriguez, J. C. Mora, J. R. Santos, and M. B. Payan, 2010: Optimization of wind farm turbines layout using an evolutive algorithm. *Renewable Energy*, 35, 1671-1681.
9. A. Kusiak, and Z. Song, 2010: Design of wind farm layout for maximum wind energy capture. *Renewable Energy*, 35, 685-694.
10. T. Knudsen, T. Bak, and M. Soltani, 2011: Prediction models for wind speed at turbine locations in a wind farm. *Wind Energy*, 14, 877-894.
11. J. Meyers, and C. Meneveau, 2012: Optimal turbine spacing in fully developed wind farm boundary layers. *Wind Energy*, 15, 305-317.
12. S. Chowdhury, J. Zhang, A. Messac, and L. Castillo, 2012: Unrestricted wind farm layout optimization (UWFLO): Investigating key factors influencing the maximum power generation. *Renewable Energy*, 38, 16-30.
13. G. C. Larsen, H. A. Madsen, K. Thomsen, and T. J. Larsen, 2008: Wake meandering: A pragmatic approach. *Wind Energy*, 11, 377-395.
14. G. España, S. Aubrun, S. Loyer, and P. Devinant, 2011: Spatial study of the wake meandering using modelled wind turbines in a wind tunnel. *Wind Energy*, 14, 923-937.
15. B. D. Hirth, J. L. Schroeder, W. S. Gunter, and J. G. Guynes, 2012: Measuring a utility-scale turbine wake using the TTUKa mobile research radars. *J. Atmos. Oceanic Technol.*, 29, 766-771.
16. Y. Käsler, S. Rahm, and R. Simmet, 2010: Wake measurement of a multi-MW wind turbine with coherent long-range pulsed Doppler wind LIDAR. *J. Atmos. Oceanic Technol.*, 27, 1529-1532.
17. F. Bingöl, J. Mann, and G. Larsen, 2010: Light detection and ranging measurements of wake dynamics. Part I: One-dimensional scanning. *Wind Energy*, 13, 51-61.

18. J. Trujillo, F. Bingol, G. C. Larsen, J. Mann, and M. Kuhn, 2011: Light detection and ranging measurements of wake dynamics. Part II: Two-dimensional scanning. *Wind Energy*, 14, 61-75.
19. E. C. Farnett, and G. H. Stevens, 1990: Pulse compression radar. *Radar Handbook*, M. I. Skolnik, Ed., McGraw-Hill, 10.1-10.39.
20. F. O'Hora, and J. Bech, 2007: Improving weather radar observations using pulse-compression techniques. *Meteor. Appl.*, 14, 389-401.
21. S. Khanna, J. G. Brasseur, J. Atmos. Sci. 55, 710 (1998).
22. G. S. Young, D. A. R. Kristovich, M. R. Hjelmfelt, and R. C. Foster, 2002: Rolls, streets, waves, and more: A review of quasi-two-dimensional structures in the atmospheric boundary layer. *Bull. Amer. Meteor. Soc.*, 83, 997-1001.
23. P. Drobinski, and R. C. Foster, 2003: On the origin of near-surface streaks in the neutrally-stratified planentary boundary layer. *Bound.-Layer Meteor.*, 108, 247-256.
24. M. Hansen, 2000: *Aerodynamics of Wind Turbines*. James and James, 144 pp.
25. B. Sanderse, S. P. van der Pijl, and B. Koren, 2011: Review of computational fluid dynamics for wind turbine wake aerodynamics. *Wind Energy*, 14, 799-819.
26. S. L. Barnes, 1964: A technique for maximizing details in numerical weather map analysis. *J. Appl. Meteor.*, 3, 396-409.
27. J. G. Schepers, T. S. Obdam, and J. Prospathopoulos, 2012: Analysis of wake measurements from the ECN Wind turbine Test Site Wieringermeer, EWTW. *Wind Energy*, 15, 575-591.
28. G. C. Larsen, and Coauthors, 2007: Dynamic wake meandering modeling. Risø Rep. Risø-R-1607(EN), 83 pp.
29. R. J. Barthelmie, S. C. Pryor., 2013: An overview of data for wake model evaluation in the Virtual Wakes Laboratory. *Appl. Energy*, 104: 834-844.
30. P. McKay, R. Carriveau, D. S. Ting., 2013: Wake impacts on downstream wind turbine performance and yaw alignment. *Wind Energy*, 16; 221-234.
31. M. Gaumond, and Coauthors, 2013: Evaluation of the wind direction uncertainty and its impact on wake modelling at the Horns Rev offshore wind farm. *Wind Energy*, in press.
32. E. S. Politi, and Coauthors, 2012: Modeling wake effects in large wind farms in complex terrain: the problem, the methods and the issues. *Wind Energy*, 15: 161-182.
33. G. V. Iungo, Y. Wu, F. Porté-Agel, 2013: Field measurements of wind turbine wakes with LIDARS. *J. Atmos. Oceanic Technol.*, 30: 274-287.
34. I. N. Smalikho, and Coauthors, 2013: LIDAR investigation of atmosphere effect on a wind turbine wake. *J. Atmos. Oceanic. Technol.*, in press.
35. B. D. Hirth, J. L. Schroeder, 2013: Documenting wind speed and power deficits behind a utilityscale wind turbine. *J. Appl. Meteor. Climatol.*, 52: 39-52.
36. C. C. Weiss, J. L. Schroeder, J. G. Guynes, P. S. Skinner, J. Beck, 2009: The TTUKa mobile Doppler radar: Coordinated radar and in situ measurements of supercell thunderstorms during Project VORTEX2. Preprints, 34$^{th}$ *Conf. On Radar Meteorology*, Williamsburg, Va., 11B.2.
37. S. Wharton, J. K. Lundquist, 2013: Assessing atmospheric stability and its impacts on rotor-disk wind characteristics at an onshore wind farm. *Wind Energy*, 15: 525-546.
38. P. Moriarty, T. Kogaki, 2007: Modeling of flow acceleration around wind farms. Proc. 5$^{th}$ *Joint Fluids Engineering Conf.*, San Diego, Calif.

What is claimed is:

1. A method for obtaining data to determine one or more characteristics of a complex wind flow field within or adjacent to a wind turbine or array of wind turbines, the method comprising the steps of:
   providing a first remote sensing device positioned to have a portion of the complex wind flow field within or adjacent to the wind turbine or array of wind turbines disposed within a first scanning sector of the first remote sensing device;
   providing a second remote sensing device positioned to have the portion of the complex wind flow field within or adjacent to the wind turbine or array of wind turbines disposed within a second scanning sector of the second remote sensing device;
   collecting a coordinated data from the first remote sensing device and the second remote sensing device using a set of sectors and elevation angles focused on the portion of the complex wind flow field disposed within both the first scanning sector and the second scanning sector;
   constructing a three-dimensional gridded data set of wind speed, wind direction and height for the portion of the complex wind flow field disposed within both the first scanning sector and the second scanning sector using the coordinated data and the one or more processors; and
   determining the one or more characteristics of the portion of the complex wind flow field within or adjacent to the wind turbine or array of wind turbines by analyzing the three-dimensional gridded data set using the one or more processors, wherein the one or more characteristics comprise a plurality of center points and at least one vertical profile of wind speeds for one or more turbine wake(s).

2. The method as recited in claim 1, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a freestream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

3. The method as recited in claim 1, wherein the first remote sensing device and the second remote sensing device comprise a radar, a Doppler radar or a LIDAR.

4. The method as recited in claim 1, wherein the first remote sensing device and the second remote sensing device are mobile or fixed.

5. The method as recited in claim 1, wherein the first scanning sector of the first remote sensing device is offset from the second scanning sector of the second remote sensing device by an angle of at least 20 degrees.

6. The method as recited in claim 1, further comprising the step of providing one or more additional remote sensing devices positioned to have the portion of the complex wind flow field or another portion of the complex wind flow field within an additional scanning sector for the additional remote sensing devices.

7. The method as recited in claim 1, wherein the step of collecting the coordinated data from the first remote sensing device and the second remote sensing device comprises the steps of:
collecting a raw data from the first remote sensing device and the second remote sensing device; and
processing the raw data to generate the coordinated data.

8. The method as recited in claim 7, wherein the step of processing the raw data comprises the steps of:
converting the raw data to a data exchange format;
interpolating the converted data from a native polar coordinate space to a Cartesian grid; and
generating the coordinated data by generating a U-horizontal wind velocity component and a V-horizontal wind velocity component for each grid point within the Cartesian grid.

9. The method as recited in claim 1, wherein the three-dimensional gridded data set comprises synthesized horizontal wind flows describing a wake of one or more turbines and a free-stream flow surrounding the wake.

10. The method as recited in claim 1, wherein the step of determining the one or more characteristics of the portion of the complex wind flow field comprises the steps of:
determining a mean domain wind direction from the three-dimensional gridded data set;
defining a vertical cross-section for each wake center point that is normal to the mean domain wind direction at a downwind bearing approximately equal to the mean domain wind direction; and
for each vertical cross-section, setting an initial wake center point, obtaining wind speed data at a plurality of heights within the vertical cross-section centered at the initial wake center point, determining a horizontal location of a minimum wind speed within the wind speed data for each of the plurality of heights, determining the wake center point within the vertical cross-section by determining a median location of the horizontal locations for all of the plurality of heights within the vertical cross-section.

11. The method as recited in claim 10, wherein:
if the wake center point is a first wake center point, the initial wake center point comprises a X location approximately downwind from the one or more turbines, and a Y location approximately equal to a center height of the one or more turbines; and
if the wake center point is a subsequent wake center point, the initial wake center point comprises the X location approximately downwind from the one or more turbines, and the Y location approximately equal to the Y location of a previous wake center point.

12. The method as recited in claim 10, wherein a minimum height and a maximum height of the plurality of heights correspond to an approximate depth of a rotor sweep of the one or more turbines.

13. The method as recited in claim 10, wherein a width of each vertical cross-section is between 125% and 175% of an approximate depth of a rotor sweep of the one or more turbines.

14. The method as recited in claim 1, further comprising the step of compositing the data using a wake-relative orientation to assess an ensemble averaged wake structure as a deficit from a free-stream flow field.

15. The method as recited in claim 1, further comprising the step of developing a mean free-stream wind profile by averaging a section of the three-dimensional gridded data set not impacted by a wake of one or more turbines.

16. The method as recited in claim 1, further comprising the steps of:
developing a plurality of vertical cross-sections through the turbine wake(s) at various distances downwind from one or more turbines;
compositing the vertical cross-sections at each distance downwind from the one or more turbines; and
presenting each composited vertical cross-section as a percent reduction/deficit from a derived free-stream wind profile.

17. The method as recited in claim 16, further comprising the step of assessing a mean and maximum wind speed deficit for each downwind composite cross-section.

18. A method for determining one or more characteristics of a complex wind flow field within or adjacent to a wind turbine or array of wind turbines, the method comprising the steps of:
providing a coordinated data from a first remote sensing device and a second remote sensing device positioned to scan a portion of the complex wind flow field within or adjacent to the wind turbine or array of wind turbines using a set of sectors and elevation angles focused on the portion of the complex wind flow field;
constructing a three-dimensional gridded data set of wind speed, wind direction and height for the portion of the complex wind flow field disposed within both the first scanning sector and the second scanning sector using the coordinated data and the one or more processors; and
determining the one or more characteristics of the complex wind flow field within or adjacent to the wind turbine or array of wind turbines by analyzing the three-dimensional gridded data set using the one or more complex wind flows and the one or more processors, wherein the one or more characteristics comprise a plurality of center points and at least one vertical profile of wind speeds for one or more turbine wake(s).

19. The method as recited in claim 18, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a free-stream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

20. The method as recited in claim 18, wherein:
the first remote sensing device is positioned to have the portion of the complex wind flow field within or adjacent to the wind turbine or array of wind turbines disposed within a first scanning sector of the first remote sensing device; and the second remote sensing device is positioned to have the portion of the complex wind flow field within or adjacent to the wind turbine or array of wind turbines disposed within a second scanning sector of the second remote sensing device.

21. The method as recited in claim 20, wherein the first remote sensing device and the second remote sensing device comprise a radar, a Doppler radar or a LIDAR.

22. The method as recited in claim 20, wherein the first remote sensing device and the second remote sensing device are mobile or fixed.

23. The method as recited in claim 20, wherein the first scanning sector of the first remote sensing device is offset from the second scanning sector of the second remote sensing device by an angle of at least 20 degrees.

24. The method as recited in claim 20, further comprising the step of providing one or more additional remote sensing devices positioned to have the portion of the complex wind flow field or another portion of the complex wind flow field within an additional scanning sector for the additional remote sensing devices.

25. The method as recited in claim 18, wherein the step of providing the coordinated data from the first remote sensing device and the second remote sensing device comprises the steps of:

providing a raw data from the first remote sensing device and the second remote sensing device; and
processing the raw data to generate the coordinated data.

26. The method as recited in claim 25, wherein the step of processing the raw data comprises the steps of:

converting the raw data to a data exchange format;
interpolating the converted data from a native polar coordinate space to a Cartesian grid; and
generating the coordinated data by generating a U-horizontal wind velocity component and a V-horizontal wind velocity component for each grid point within the Cartesian grid.

27. The method as recited in claim 18, wherein the set of three-dimensional gridded data set comprises synthesized horizontal wind flows describing a wake of one or more turbines and a free-stream flow surrounding the wake.

28. The method as recited in claim 18, wherein the step of determining the one or more characteristics of the portion of the complex wind flow field comprises the steps of:

determining a mean domain wind direction from the three-dimensional gridded data set;
defining a vertical cross-section for each wake center point that is normal to the mean domain wind direction at a downwind bearing approximately equal to the mean domain wind direction; and
for each vertical cross-section, setting an initial wake center point, obtaining wind speed data at a plurality of heights within the vertical cross-section centered at the initial wake center point, determining a horizontal location of a minimum wind speed within the wind speed data for each of the plurality of heights, determining the wake center point within the vertical cross-section by determining a median location of the horizontal locations for all of the plurality of heights within the vertical cross-section.

29. The method as recited in claim 28, wherein:

if the wake center point is a first wake center point, the initial wake center point comprises a X location approximately downwind from the one or more turbines, and a Y location approximately equal to a center height of the one or more turbines; and if the wake center point is a subsequent wake center point, the initial wake center point comprises the X location approximately downwind from the one or more turbines, and the Y location approximately equal to the Y location of a previous wake center point.

30. The method as recited in claim 28, wherein a minimum height and a maximum height of the plurality of heights correspond to an approximate depth of a rotor sweep of the one or more turbines.

31. The method as recited in claim 28, wherein a width of each vertical cross-section is between 125% and 175% of an approximate depth of a rotor sweep of the one or more turbines.

32. The method as recited in claim 18, further comprising the step of compositing the data using a wake-relative orientation to assess an ensemble averaged wake structure as a deficit from a free-stream flow field.

33. The method as recited in claim 18, further comprising the step of developing a mean free-stream wind profile by averaging a section of the three-dimensional gridded data set not impacted by a wake of one or more turbines.

34. The method as recited in claim 18, further comprising the steps of:

developing a plurality of vertical cross-sections through the wake at various distances downwind from the one or more turbines;
compositing the vertical cross-sections at each distance downwind from the one or more turbines; and
presenting each composited vertical cross-section as a percent reduction/deficit from a derived free-stream wind profile.

35. The method as recited in claim 34, further comprising the step of assessing a mean and maximum wind speed deficit for each downwind composite cross-section.

36. A system for obtaining data to determine one or more characteristics of a complex wind flow field within or adjacent to a wind turbine or array of wind turbines, the method comprising the steps of:

a first remote sensing device positioned to have a portion of the complex wind flow field within or adjacent to the wind turbine or array of wind turbines disposed within a first scanning sector of the first remote sensing device;
a second remote sensing device positioned to have the portion of the complex wind flow field within or adjacent to the wind turbine or array of wind turbines disposed within a second scanning sector of the second remote sensing device; and
one or more processors that collect a coordinated data from the first remote sensing device and the second remote sensing device using a set of sectors and elevation angles focused on the portion of the complex wind flow field disposed within both the first scanning sector and the second scanning sector, construct a three-dimensional gridded data set of wind speed, wind direction and height for the portion of the complex wind flow field disposed within both the first scanning sector and the second scanning sector using the coordinated data and the one or more processors, and determine the one or more characteristics of the portion of the complex wind flow field within or adjacent to the wind turbine or array of wind turbines by analyzing the three-dimensional gridded data set using the one or more processors, wherein the one or more characteristics comprise a plurality of center points and at least one vertical profile of wind speeds for one or more turbine wake(s).

37. The system as recited in claim 36, wherein the one or more characteristics comprise at least two characteristics which further comprise a mean and variable structure of the portion of the complex wind flow field, locating and tracking enhanced turbulence within the portion of the complex wind flow field, a length or width of the one or more turbine wake(s), a set of horizontal wind speed deficits within the portion of the complex wind flow field relative to a free-stream flow, a forecasted power output for one or more turbines within the portion of the complex wind flow field, recognition of a localized event of interest containing changes in wind speed and/or direction, a vertical profile of horizontal wind speeds and directions within the complex wind flow field, a shear across a turbine rotor sweep, a turbine wake deficit from inflow, a turbine wake orientation, a turbine wake evolution, a strength of high speed channels in between two or more turbine wakes, a turbine wake structure, transient wind gusts and lulls, or a combination thereof.

38. The system as recited in claim 36, wherein the first remote sensing device and the second remote sensing device comprise a radar, a Doppler radar or a LIDAR.

39. The system as recited in claim 36, wherein the first remote sensing device and the second remote sensing device are mobile or fixed.

40. The system as recited in claim 36, wherein the first scanning sector of the first remote sensing device is offset from the second scanning sector of the second remote sensing device by an angle of at least 20 degrees.

41. The system as recited in claim 36, further comprising one or more additional remote sensing devices positioned to have the portion of the complex wind flow field or another portion of the complex wind flow field within an additional scanning sector for the additional remote sensing devices.

42. The system as recited in claim 36, wherein the one or more processors collect the coordinated data from the first remote sensing device and the second remote sensing device by:
collecting a raw data from the first remote sensing device and the second remote sensing device; and
processing the raw data to generate the coordinated data.

43. The system as recited in claim 42, wherein the one or more processors process the raw data by:
converting the raw data to a data exchange format;
interpolating the converted data from a native polar coordinate space to a Cartesian grid; and
generating the coordinated data by generating a U-horizontal wind velocity component and a V-horizontal wind velocity component for each grid point within the Cartesian grid.

44. The system as recited in claim 36, wherein the set of three-dimensional gridded data set comprises synthesized horizontal wind flows describing a wake of one or more turbines and a free-stream flow surrounding the wake.

45. The system as recited in claim 36, wherein the one or more processors determine the one or more characteristics of a wake of one or more turbines by:

determining a mean domain wind direction from the three-dimensional gridded data set;
defining a vertical cross-section for each wake center point that is normal to the mean domain wind direction at a downwind bearing approximately equal to the mean domain wind direction; and
for each vertical cross-section, setting an initial wake center point, obtaining wind speed data at a plurality of heights within the vertical cross-section centered at the initial wake center point, determining a horizontal location of a minimum wind speed within the wind speed data for each of the plurality of heights, determining the wake center point within the vertical cross-section by determining a median location of the horizontal locations for all of the plurality of heights within the vertical cross-section.

46. The system as recited in claim 45, wherein:
if the wake center point is a first wake center point, the initial wake center point comprises a X location approximately downwind from the one or more turbines, and a Y location approximately equal to a center height of the one or more turbines; and
if the wake center point is a subsequent wake center point, the initial wake center point comprises the X location approximately downwind from the one or more turbines, and the Y location approximately equal to the Y location of a previous wake center point.

47. The system as recited in claim 45, wherein a minimum height and a maximum height of the plurality of heights correspond to an approximate depth of a rotor sweep of the one or more turbines.

48. The system as recited in claim 45, wherein a width of each vertical cross-section is between 125% and 175% of an approximate depth of a rotor sweep of the one or more turbines.

49. The system as recited in claim 36, wherein the one or more processors further composite the data using a wake-relative orientation to assess a ensemble averaged wake structure as a deficit from a free-stream flow field.

50. The system as recited in claim 36, wherein the one or more processors further develop a mean free-stream wind profile by averaging a section of the coordinated data not impacted by a wake of one or more turbines.

51. The system as recited in claim 36, wherein the one or more processors further:
develop a plurality of vertical cross-sections through the wake at various distances downwind from the one or more turbines;
composite the vertical cross-sections at each distance downwind from the one or more turbines; and
present each composited vertical cross-section as a percent reduction/deficit from a derived free-stream wind profile.

52. The system as recited in claim 51, wherein the one or more processors further assess a mean and maximum wind speed deficit for each downwind composite cross-section.

* * * * *